(12) United States Patent
Haneda et al.

(10) Patent No.: US 8,842,262 B2
(45) Date of Patent: Sep. 23, 2014

(54) RADAR APPARATUS AND LIGHT SCAN APPARATUS

(75) Inventors: Narihiro Haneda, Nagoya (JP); Hiroshi Ando, Nagoya (JP)

(73) Assignee: DENSO CORPORATION, Kariya (JP)

( * ) Notice: Subject to any disclaimer, the term of this patent is extended or adjusted under 35 U.S.C. 154(b) by 235 days.

(21) Appl. No.: 13/477,197

(22) Filed: May 22, 2012

(65) Prior Publication Data

US 2012/0299764 A1  Nov. 29, 2012

(30) Foreign Application Priority Data

May 24, 2011 (JP) .................... 2011-115929
Dec. 26, 2011 (JP) .................... 2011-283887

(51) Int. Cl.
*G01S 7/499* (2006.01)
*G01S 17/42* (2006.01)
*G01S 7/481* (2006.01)

(52) U.S. Cl.
CPC .............. *G01S 7/499* (2013.01); *G01S 17/42* (2013.01); *G01S 7/4815* (2013.01); *G01S 7/4817* (2013.01)
USPC .......... 356/5.01; 356/3.01; 356/4.01; 356/5.1

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| 8,000,181 | B2 | 8/2011 | Yamada | |
| 2009/0059766 | A1* | 3/2009 | Yamada | 369/112.01 |
| 2009/0323189 | A1 | 12/2009 | Taniguchi | |

FOREIGN PATENT DOCUMENTS

| JP | 03-75544 A | 3/1991 |
| JP | B2-2789741 | 8/1998 |
| JP | A-10-300421 | 11/1998 |
| JP | A-10-300851 | 11/1998 |
| JP | 2000-321019 A | 11/2000 |
| JP | A-2005-114857 | 4/2005 |
| JP | A-2008-256770 | 10/2008 |
| JP | A-2010-70117 | 4/2010 |
| JP | B2-4505718 | 7/2010 |

OTHER PUBLICATIONS

Hisamitsu et al. "3-D Laser Radar Railroad Crossing Obstacle Detection System." *IHI Technical Report*, vol. 48.1: (Mar. 2008).
Office Action mailed Apr. 16, 2013 in corresponding JP patent application No. 2011-115929 (and English translation).

* cited by examiner

*Primary Examiner* — Luke Ratcliffe
(74) *Attorney, Agent, or Firm* — Posz Law Group, PLC

(57) ABSTRACT

A radar apparatus for detecting a distance to an object by receiving an electromagnetic wave reflected by the object is disclosed. The radar apparatus comprises a scan part and an electromagnetic wave emitter. The scan part includes a polarized light separation member configured to pass a preset first component of the electromagnetic wave and reflect a preset second component of the electromagnetic wave. The first and second components, respectively, are polarized lights having first and second polarization directions, which are perpendicular to each other. The scan part scans the second component of the electromagnetic wave in a predetermine scan angle range by rotating the polarized light separation member around a predetermined rotation axis. The electromagnetic wave emitter emits the electromagnetic wave toward the polarized light separation member of the scan part.

21 Claims, 11 Drawing Sheets

FIG. 10

RADAR APPARATUS AND LIGHT SCAN APPARATUS

CROSS REFERENCE TO RELATED APPLICATION

The present application is based on and claims priority to Japanese Patent Applications No. 2011-115929 filed on May 24, 2011 and No 2011-283887 filed on Dec. 26, 2011, disclosures of which are incorporated herein by reference.

TECHNICAL FIELD

The present disclosure relates to a radar apparatus for detecting a distance to an object by transmitting an electromagnetic wave and receiving the electromagnetic wave reflected by the object. The present disclosure also relates to a light scan apparatus.

BACKGROUND

A known radar apparatus includes a light source, a light detector, a polarized light separation element, and a scan element. The light source emits a pulsed laser light. The light detector detects the laser light reflected by an object (also referred to as a reflected laser light). The polarized light separation element is disposed on an optical path of the laser light emitted from the light source, so that the polarized light separation element passes a part of the laser light and reflects another part of the leaser light toward the light detector. The scan element scans the laser light transmitting through the polarized light separation element and reflects the incident laser light toward the polarized light separation element. The radar apparatus measures a distance to an object which reflects the laser light, by measuring a period of time between when the pulsed laser light is emitted by the light source and when the reflected laser light is detected by the light detector (see JP-2789741B).

In the radar apparatus described in JP-2789741B, the scan element scans the laser light, and the polarized light separation element separates the polarized laser light. Thus, the light scanning and the polarized light separating are performed with use of different elements. Therefore, the radar apparatus described in JP-2789741B requires high-accurate adjustment of a positional relationship between the scan element and the polarized light separation element.

JP-2010-70117A describes a vehicle equipped with a radar and an image display device. The radar emits a laser light toward a forward area of the vehicle and receives the reflected laser light to detect an object in the forward area of the vehicle. The image display device emits a beam representing an image to a vehicle compartment to provide information to a driver.

In JP-2010-70117A, an optical system for emitting a laser light to the forward area of the vehicle and an optical system for emitting a laser light to the vehicle compartment are separated. The number of parts in a vehicle system is disadvantageously large.

SUMMARY

It is an object of the present disclosure to provide a radar apparatus that can eliminate the need for adjustment of a positional relationship between a scan element and a polarized light separation element. It is also an object of the present disclosure to provide a light scan apparatus that enables a radar and an image display device to share an optical system.

According to a first example of the present disclosure, a radar apparatus for detecting a distance to an object by receiving an electromagnetic wave reflected by the object is provided. The radar apparatus comprises a scan part and an electromagnetic wave emitter. The scan part includes a polarized light separation member configured to pass a preset first component of the electromagnetic wave and reflect a preset second component of the electromagnetic wave. The first and second components, respectively, are polarized lights having first and second polarization directions, which are perpendicular to each other. The scan part scans the second component of the electromagnetic wave in a predetermine scan angle range by rotating the polarized light separation member around a predetermined rotation axis. The electromagnetic wave emitter emits the electromagnetic wave toward the polarized light separation member of the scan part.

According to the above radar apparatus, it is possible to eliminate the need for adjustment of a positional relationship between a scan element and a polarized light separation element.

According to a second example of the present disclosure, a light scan apparatus is provided. The light scan apparatus comprises a visible light emitter, an invisible light emitter, a light combiner, a light separator, an invisible light detector, and a polarized light scan part. The visible light emitter emits a visible light. The invisible light emitter emits an invisible light. The light combiner combines the visible light emitted from the visible light emitter and the invisible light emitted from the invisible light emitter, and emits the combined visible and invisible lights in a preset direction. The polarized light scan part scans a preset first polarized light in a predetermined scan angle range by reflecting the first polarized light toward the light separator when the visible and invisible lights coming from the light combiner are incident on the polarized light scan part. The light separator passes a first part of an incident light and reflects a second part of the incident light at an reflection angle corresponding to an incident angle of the incident light. The first part of the incident light is a light that has a same wavelength as the invisible light emitted from the invisible light emitter. The second part of the incident light is a light that has a same wavelength as the visible light emitted from the visible light emitter. The polarized light scan part guides a preset second polarized light toward the invisible light detector when a light coming from a scan passage region is incident on the polarized light scan part. The invisible light detector detects an incident light when the incident light has the same wavelength as the invisible light emitted from the invisible light emitter. In the above, the scan passage region is a region through which the first polarized light scanned by the polarized light scan part travels. Additionally, the first polarized light and the second polarized light, respectively, have a first polarization direction and a second polarization direction perpendicular to each other.

According to the light scan apparatus, it becomes possible for a radar and an image display device to share an optical system.

BRIEF DESCRIPTION OF THE DRAWINGS

The above and other objects, features and advantages of the present disclosure will become more apparent from the following detailed description made with reference to the accompanying drawings. In the drawings:

FIG. 10 is a diagram illustrating a light scan apparatus of a fourth example of the second embodiment.

DETAILED DESCRIPTION

<First Embodiment>

A first embodiment will be described with reference to the accompanying drawings.

(First Example of First Embodiment)

Figure 1:
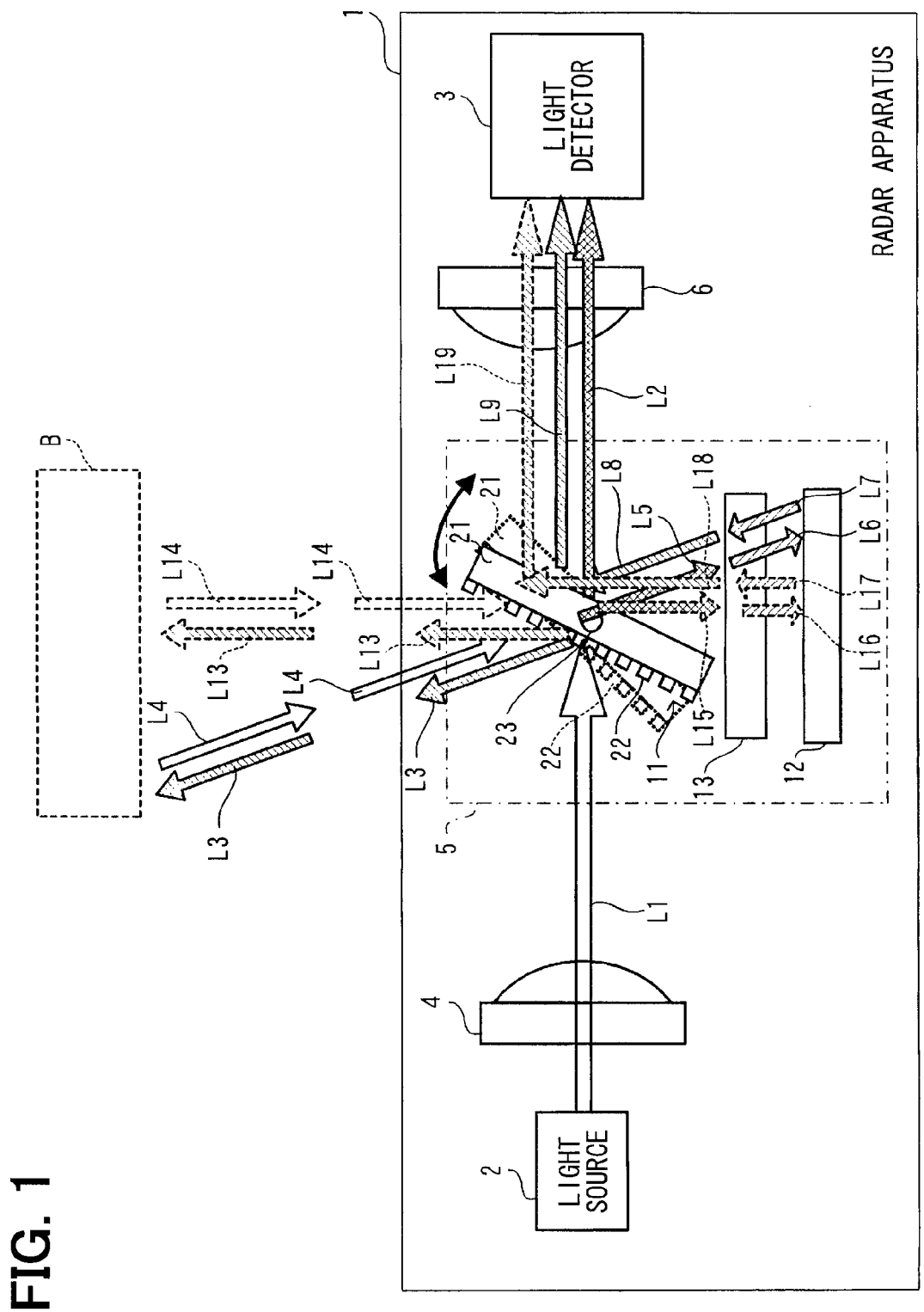
FIG. 1 is a diagram illustrating a radar apparatus of a first example of a first embodiment.

A first example of a first embodiment will be described. FIG. 1 illustrates a configuration and an operation of a radar apparatus 1 of the first example of the first embodiment.

As shown in FIG. 1, the radar apparatus 1 includes a light source 2, a light detector 3, a light projection optical system 4, a scan part 5, and light receipt optical system 6. The light source 2 emits a pulsed laser light as a radar wave. The light detector 3 detects the laser light. The light projection optical system 4 projects the laser light, which is emitted from the light source 2, in a predetermined direction. The scan part 5 scans the laser light projected by the light projection optical system 4. The light receipt optical system 6 guides the incident laser light toward the light detector 3. The light projection optical system 4 and the light receipt optical system 6 are disposed on opposite sides of the scan part 5 so as to face each other.

The scan part 5 includes a polarized light separation variable angle element 11, a retroreflecting element 12, and a quarter-wave plate 13. The polarized light separation variable angle element 11 includes a substrate 21 made of a material transparent to the laser light, and a polarized light separation structure 22 formed on a surface of the substrate 21 to provide a polarized light separation function.

The polarized light separation structure 22 may include the following configuration. Multiple thin wires made of an electrically-conductive material (e.g., Al, Au, Ag, Cu etc.) are arranged as a grating so that the multiple thin wires are parallel to a preset direction (referred to as "grating direction"), and that an interval of the multiple thin wires is shorter than a wavelength of the laser light emitted form the light source 2.

The polarized light separation variable angle element 11 is arranged on an optical path of a certain laser light projected by the light projection optical system 4. The certain laser light projected by the light projection optical system 4 is a laser light that directly reaches the light receipt optical system 6 without being reflected by the scan part 5. The polarized light separation variable angle element 11 is supplied with a drive force from a driving source (not shown), thereby oscillating around a rotation shaft 23 of the substrate 21. In a predetermined scan angle range, the polarized light separation variable angle element 11 performs one-dimensional scanning of the laser light projected by the light projection optical system 4. A scan mechanism may include a micro electro mechanical system (MEMS), a galvanometer, or the like.

The retroreflecting element 12 has a function to reflect an incident light in a direction opposite to an incident direction. The retroreflecting element 12 is arranged on an opposite side of the polarized light separation variable angle element 11 from a scan passage region, which refers to a region in which the laser light scanned by the polarized light separation variable angle element 11 travels. The laser light passing through the polarized light separation variable angle element 11 is reflected by the retroreflecting element 12. The retroreflecting element 12 may include one of a corner cube array, a bead array, and a prism array on a surface.

The quarter-wave plate 13 converts a linearly-polarized light into a circularly-polarized light. The quarter-wave plate 13 is arranged between the polarized light separation variable angle element 11 and the retroreflecting element 12. In the present embodiment, an element that does not rotate a polarization direction in reflecting the laser light is used as the retroreflecting element 12.

Explanation will be given on how, the above radar apparatus 1 detects an object which reflects the laser light. First, the laser light emitted from the light source 2 passes through the light projection optical system 4 and arrives at the polarized light separation variable angle element 11 (see the light "L1" in FIG. 1). Then, a TM component of the laser light transmits through the polarized light separation variable angle element 11, passes through the light receipt optical system 6, and thereafter arrives at the light detector 3 (see the light "L1" in FIG. 1). The TM component of the laser light is a polarized light whose polarization direction is parallel to the grating direction.

A TE component of the laser light, which is a polarized light whose polarization direction is perpendicular to the grating direction, is reflected by the polarized light separation variable angle element 11 and is emitted as a radar wave in a direction corresponding to a scan angle of the polarized light separation variable angle element 11.

Thereafter; the laser light reflected by an object "B" (also called "reflected laser light") arrives at the polarized light separation variable angle element 11 (see the lights "L4" and "L1" in FIG. 1). A main component of the laser light reflected by the polarized light separation variable angle element 11 and emitted as the radar wave may be the TE component, However, the laser light may be randomly reflected by the object "B" and may contain not only the TE component but also the TM component. Therefore, the TM component of the reflect laser light arriving at the polarized light separation variable angle element 11 transmits through the polarized light separation variable angle element 11 (see the light "L5", "L15" in FIG. 1).

After transmitting through the polarized light separation variable angle element 11, the TM component of the reflected laser light passes through the quarter-wave plate 13. Because of this, the reflected laser light is converted from the linearly-polarized light to the circularly-polarized light, and thereafter, the reflected laser light arrives at the retroreflecting element 12 (see the light "L6" and "L16").

The reflected laser light arriving at the retroreflecting element 12 is reflected by the retroreflecting element 12 in a direction opposite to an incident direction, and thereafter passes through the quarter-wave plate 13 again (see the light "L7" and "L17"). Because of this, the reflected laser light is converted to the TE component. The TE component arrives at the polarized light separation variable angle element 11 (see the light "L8" and "L18").

Thereafter, the TE component of the reflected laser light is reflected by the polarized, light separation variable angle element 11 and is emitted toward the light receipt optical system 6 (see the light "L9", "L19"). As a result, the reflected laser light arrives at the light detector 3. The object which reflects the laser light can be detected.

Furthermore, based on a time difference between emission of the pulsed laser light by the light source 2 and detection of the reflected light by the light detector 3, a distance to the object reflecting the laser light can be measured. According to the above radar apparatus 1, since both of the polarized light separation of the laser light and the scanning of the laser light are performed by the polarized light separation variable angle element 11, it is possible to eliminate the need for adjusting a positional relationship between an element for separating a polarized light from the laser light and an element for scanning the laser light. Furthermore, the radar apparatus 1 can be downsized due to reduction of the number of elements of the radar apparatus 1.

The polarized light separation variable angle element 11 is configured such that the multiple thin wires made of an electrically-conductive material are parallel to the preset direction (grating direction) and arranged at predetermined intervals. Since a grating structure can be formed using an ultra-fine processing technology, the polarized light separation variable angle element 11 can be downsized as compared with a conventional one such as a prism polarized light splitter, in which bonded rectangular prisms are arranged into a cube form.

In the present embodiment, the polarized light separation variable angle element 11 can correspond to a scan part or a scan means. The light source 2 can correspond to an electromagnetic wave emitter. The substrate 21 and the polarized light separation structure 22 can correspond to a polarized light separation member. The rotation shaft 23 can correspond to a predetermined rotation axis. The TM component can correspond to a first component, which is a polarized light having a first polarization direction. The TE component can correspond to a second component, which is a polarized light having a second polarization direction perpendicular to the first polarization direction.

The light detector 3 can correspond to a electromagnetic wave detector. The retroreflecting element 12 and the quarter-wave plate 13 can correspond to a conversion reflector. The polarized light separation structure 22 can correspond to a micro period structure.

(Second Example of First Embodiment)

Figure 2:
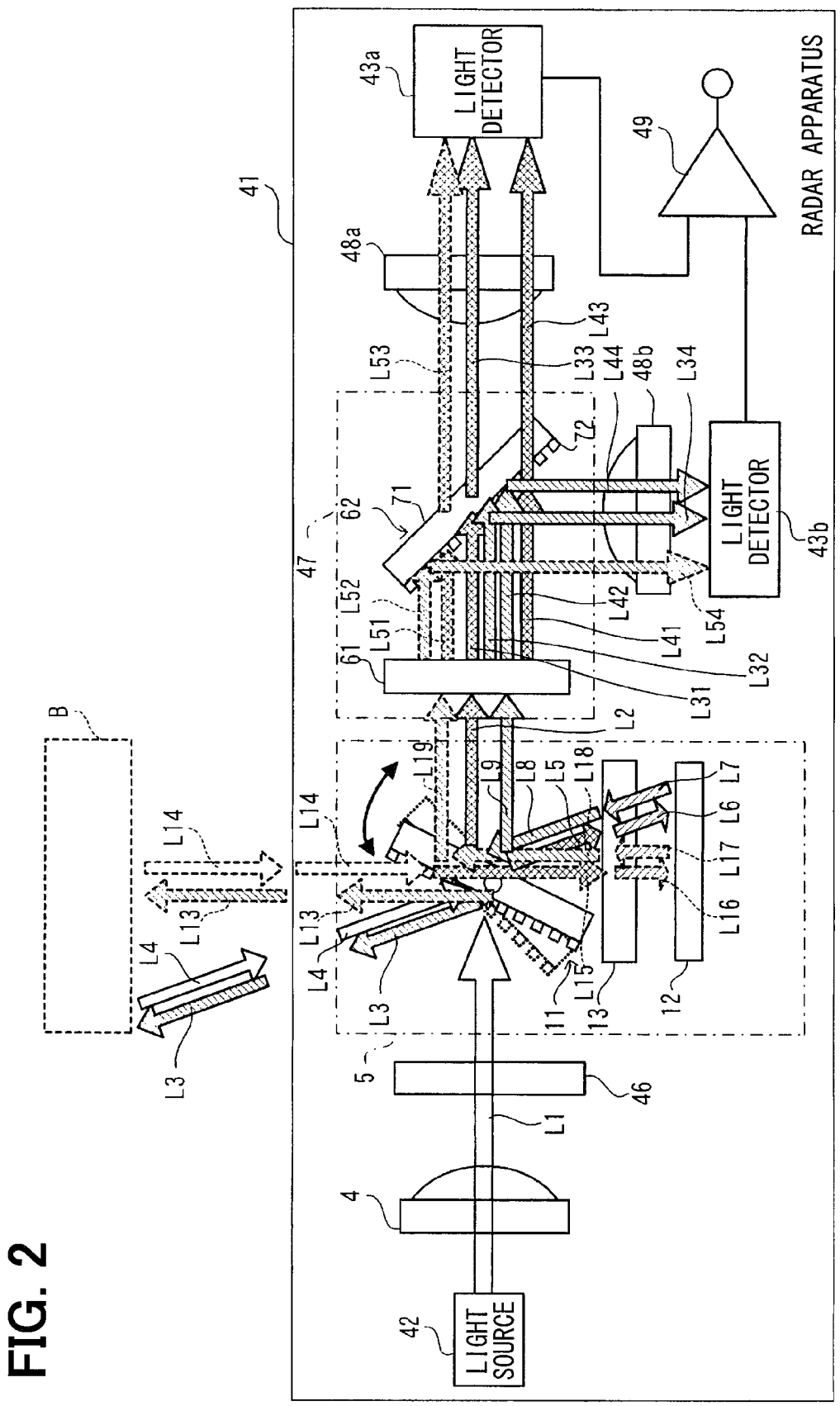
FIG. 2 is a diagram illustrating a radar apparatus of a second example of the first embodiment.

A second example of the first embodiment will be described. FIG. 2 is a diagram illustrating a configuration and an operation of a radar apparatus 41 of the second example of the first embodiment.

As shown in FIG. 2, the radar apparatus 41 includes a light source 42, light detectors 43a and 43b, a light projection optical system 4, a scan part 5, a half-wave plate 46, a light divider 47, light receipt optical systems 48a and 48b, and a differential amplifier 49. The light source 42 emits a pulsed laser light as a radar wave. The light detectors 43a and 43b detect the laser light. The light projection optical system 4 projects the laser light, which is emitted from the light source 2, in a predetermined direction. The scan part 5 scans the laser light projected by the light projection optical system 4. The half-wave plate 46 is arranged between the light projection optical system 4 and the scan part 5. The light divider 47 divides the incoming laser light into two lights in two directions. The light receipt optical systems 48a, 48b guide the incoming laser light, which comes from the light divider 47, toward the light detectors 43a, 43b. The differential amplifier 49 receives detection signals of the light detectors 43a, 43b.

The scan part 5 includes a polarized light separation variable angle element 11, a retroreflecting element 12, and a quarter-wave plate 13. The scan part 5 of the second example of the first embodiment has substantially the same configuration as that of the first example of the first embodiment.

The half-wave plate 46 has a reference axis thereof. The reference axis is inclined at an inclination angle with respect to a polarization direction of the laser light incoming from the polarized light separation variable angle element 11. The half-wave plate 46 has a function to change a ratio between the TE component and the TM component of the incoming laser light according to the inclination angle. The half-wave plate 46 projects the laser light, which has the ratio between the TE component and the TM component according to the inclination angle of the reference axis, toward the polarized light separation variable angle element 11.

The light divider 47 includes a half-wave plate 61 and a polarization light splitter 62. Like the half-wave plate 46, the half-wave plate 61 changes a ratio between the TE component and the TM component of the incoming laser light according to an inclination angle. Like the polarized light separation variable angle element 11, the polarization light splitter 62 includes a substrate 71 and a polarized light separation structure 72. The substrate 71 is formed into a plate shape and made of a material transparent to the laser light. The polarized light separation structure 72 is formed on a surface of the substrate 21 and has a polarized light separation function. The polarization light splitter 62 divides the laser light, which comes from the half-wave plate 61, into two lights in two directions. The TM component of the laser light incoming from the half-wave plate 61 transmits through the polarization light splitter 62. The TE component of the laser light incoming from the half-wave plate 61 is reflected by the polarization light splitter 62. In the above, the TM component is a polarized light whose polarization direction is parallel to the grating direction of the polarized light separation structure 72. The TE component is a component perpendicular to the grating direction of the polarized light separation structure 72.

The laser light transmitting through the polarization light splitter 62 is guided toward the light detector 43a by the light receipt optical system 48a. The laser light reflected by the polarization light splitter 62 is guided toward the light detector 43b by the light receipt optical system 48b.

Explanation will be given on how the above radar apparatus 41 detects an object which reflects the laser light. First, the laser light emitted from the light source 42 passes through the light projection optical system 4 and arrives at the polarized light separation variable angle element 11 (see the light "L1" in FIG. 2). Then, the TM component of the laser light, which component is the polarized light with the polarization direction parallel to the grating direction, transmits through the polarized light separation variable angle element 11 and thereafter arrives at the half-wave plate 61 (see the light "L2" in FIG. 2).

Thereafter, when passing through the half-wave plate 61, the laser light is converted into a light having both of the TM component and the TE component (see the light "L31" and "L32" in FIG. 2). Then, the TM component of the laser light transmits through the polarization light splitter 62, and then is projected toward the light receipt optical system 48a (see L33 in FIG. 2). The TE component of the laser light is reflected by the polarization light splitter 62, and then is projected toward the light receipt optical system 48a (see L34 in FIG. 2). In this way, the laser light arrives at the light detectors 43a and 43b.

The TE component, which has the polarization direction perpendicular to the grating direction, is reflected by the polarized light separation variable angle element 11. The reflected TE component is emitted as a radar wave in a direction according to the scan angle of the polarized light separation variable angle element 11 (see "L3" and "L13" in FIG. 2).

Thereafter, the laser light reflected by the object "B" (i.e., the reflected laser light) arrives at the polarized light separation variable angle element 11 (see the light "L4" and "L14" in FIG. 2). A main component of the laser light reflected by the polarized light separation variable angle element 11 and emitted as the radar wave is the TE component. However, in some cases, the laser light may be randomly reflected by the object "B" and thus contain not only the TE component but also the TM component. Among the reflected laser light arriving at the polarized light separation variable angle element 11, the TM component transmits through the polarized light separation variable angle element 11 (see the light "L5", "L15" in FIG. 2).

After transmitting through the polarized light separation variable angle element 11, the TM component of the reflected laser light passes through the quarter-wave plate 13. Because of this, the reflected laser light is converted from the linearly-polarized light to the circularly-polarized light, and thereafter, the reflected laser light arrives at the retroreflecting element 12 (see the light "L6" and "L16" in FIG. 2).

The reflected laser light is reflected by the retroreflecting element 12 in a direction opposite to an incident direction, and thereafter passes through the quarter-wave plate 13 again (see the light "L7" and "L17" in FIG. 2). Because of this, the reflected laser light converted to the TE component arrives at the retroreflecting element 12 (see the light "L8" and "L18" in FIG. 2).

Thereafter, when the TE component of the reflected laser light arrives at the polarized light separation variable angle element 11, the TE component is reflected by the polarized light separation variable angle element 11 and is emitted toward the half-wave plate 61 (see the light "L9", "L19" in FIG. 2). When transmitting through the half-wave plate 61, the reflected laser light is converted into a light having both of the TM component and the TE component (see the light "L41", "L42", "L51" and "L52" in FIG. 2). The TM component transmits through the polarization light splitter 62 and is emitted toward the light receipt optical system 48a (see the light "L43" and "L53" in FIG. 2). The TM component is reflected by the polarization light splitter 62 and thus emitted toward the light receipt optical system 48a (see the light "L44" and "L54" in FIG. 2). As a result, the reflected laser light arrives at the light detectors 43a and 43b. The object reflecting the laser light can be detected.

Each light detector 43a, 43b generates a beat signal by combining two laser lights. One of the two laser lights is a laser light that is emitted from the light source 42 and then arrives at the light detector 43a, 43b without being reflected by polarized light separation variable angle element 11. The other is a laser light that is emitted from the light source 42 and reflected by polarized light separation variable angle element 11, and thereafter arrives at the light detector 43a, 43b. The beat signal outputted from the light detector 43a and the beat signal outputted from the light detector 43b are inputted to the differential amplifier 49. With use of optical hetrodyne detection (see JP-H10-300421A1 for example), a distance to the object which reflects the laser light can be measured.

According to the above radar apparatus 41, since both of the polarized light separation of the laser light and the scanning of the laser light are performed by the polarized light separation variable angle element 11, it is possible to eliminate the need for adjusting a positional relationship between an element for separating a polarized light from the laser light and an element for scanning the laser light. Furthermore, due to the reduction of the number of elements of the radar apparatus 1, the radar apparatus 1 can be downsized.

Furthermore, the half-wave plate 46 is arranged on an optical path of the laser light from the light source 42 to the polarized light separation variable angle element 11. Thereafter, a ratio between the laser light transmitting through the polarized light separation variable angle element 11 and the laser light reflected by the polarized light separation variable angle element 11 can be changed.

In the present embodiment, the half-wave plate 46 can correspond to a ratio convertor.

(Third Example of First Embodiment)

A third example of the first embodiment will be described with reference to the accompanying drawings.

Figure 3:
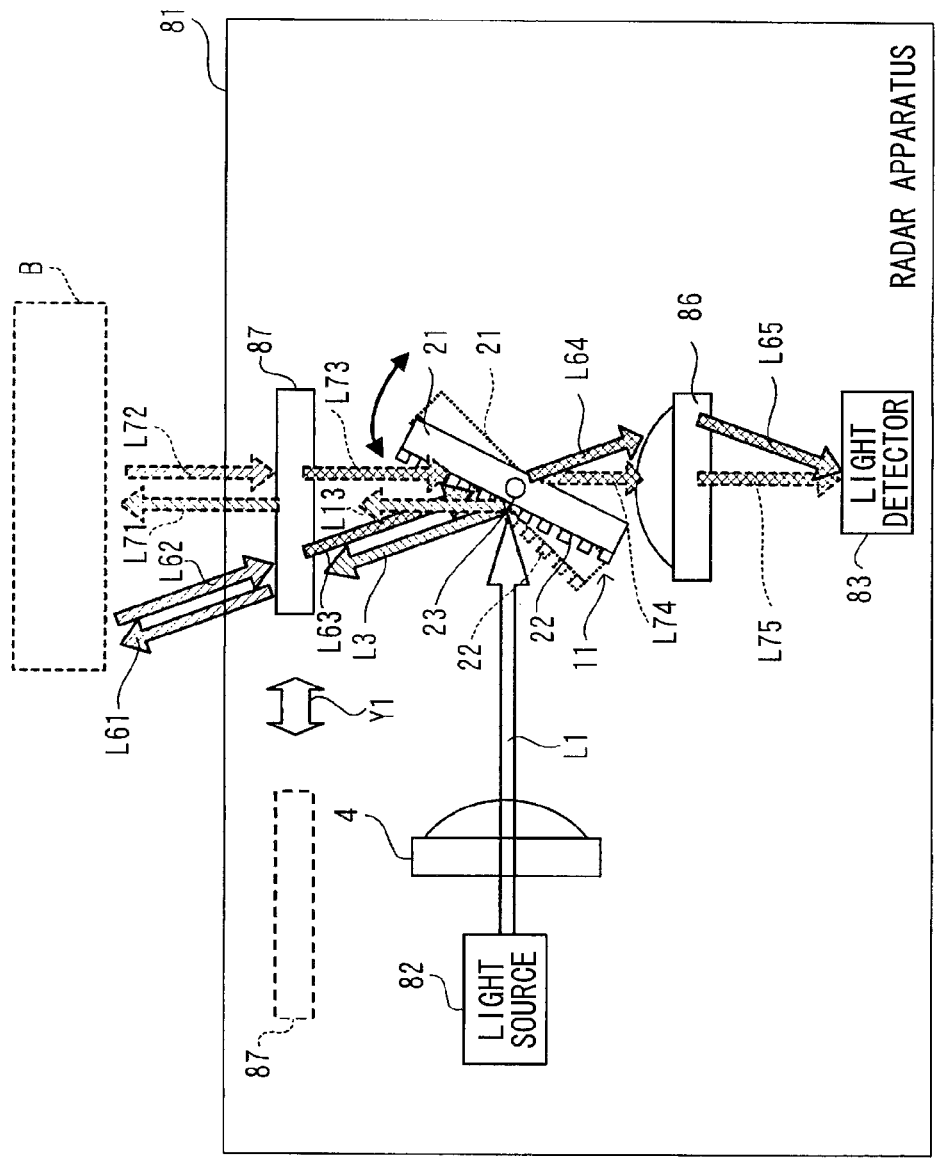
FIG. 3 is a diagram illustrating a radar apparatus of a third example of the first embodiment.

FIG. 3 is a diagram illustrating a configuration and an operation of a radar apparatus 81 of the third example of the first embodiment. As shown in FIG. 3, the radar apparatus 81 includes a light source 82, a light detector 83, a light projection optical system 4, a polarized light separation variable angle element 11, a light receipt optical system 86, and a quarter-wave plate 87. The light source 82 emits a pulsed laser light as a radar wave. The light detector 83 detects the laser light. The light projection optical system 4 projects the laser light, which is emitted from the light source 82, in a predetermined direction. The light receipt optical system 86 guides the incoming laser light toward the light detector 3.

The light source 82 includes a laser generation device (not shown) for continuously generating a laser light, and a shutter (not shown) arranged on an optical path from the light source 82 to the light projection optical system 4. The shutter may be an optical shutter. The radar apparatus 81 repeats opening and closing the shutter, thereby emitting the pulsed laser light.

Like the first example of the first embodiment, the polarized light separation variable angle element 11 includes the substrate 21 and the polarized light separation structure 22. In the predetermined scan angle range, the polarized light separation variable angle element 11 performs the one-dimensional scanning of the laser light projected from the light projection optical system 4.

The light receipt optical system 86 is arranged on opposite side of the polarized light separation variable angle element 11 from a scan passage region. The scan passage region is a region where the laser light scanned by polarized light separation variable angle element 11 travels. The light receipt optical system 86 guides the laser light, which has transmitted through the polarized light separation variable angle element 11, toward the light detector 3.

The quarter-wave plate 87 is arranged on an opposite side of the polarized light separation variable angle element 11 from the light receipt optical system 86. The quarter-wave plate 87 is movable between a laser passage position and a laser un-passage position (see arrow Y1 in FIG. 3). The laser passage position is defined as a position where the laser light scanned by polarized light separation variable angle element 11 passes through the quarter-wave plate 87. The laser un-passage point is defined as a position where the laser light scanned by polarized light separation variable angle element 11 does not pass through the quarter-wave plate 87. The motion of the quarter-wave plate 87 is controlled in the following way. When the quarter-wave plate 87 is in the laser passage position, the quarter-wave plate 87 moves from the laser passage position to the laser un-passage position if object detection is unsuccessful after the scanning of the laser light. Inversely, when the quarter-wave plate 87 is in the laser un-passage position, the quarter-wave plate 87 moves from the laser un-passage position to the laser passage position if object detection is unsuccessful after the scanning of the laser light.

Explanation will be given on how the above radar apparatus 81 detects an object which reflects the laser light. First, the light source 82 emits the laser light. The laser light transmits through the light projection optical system 4 and arrives at the polarized light separation variable angle element 11 (see the light "L1" in FIG. 3). A TE component of the laser light, which component is a polarized light with the polarization direction perpendicular to the grating direction, is reflected by the polarized light separation variable angle element 11 and is emitted as a radar wave in a direction corresponding to a scan angle of the polarized light separation variable angle element 11 (see the light "L3" and "L13" in FIG. 3).

In this case, when the quarter-wave plate 87 is in the laser passage position, the scanned laser light passes through the quarter-wave plate 87. As a result, the laser light is converted into a circularly polarized light. The converted laser light arrives at the object "B" (see the light "L61" and "L71" in FIG. 3). In the above, in reflecting the laser light, the object "B" may not rotate the polarization direction of the laser light because of its surface material (e.g., cat's-eye). In this case, the laser light reflected by the object "B" (i.e., reflected laser light) passes through the quarter-wave plate 87 again. Thus, the laser light is converted into the TM component. This converted laser light arrives at the polarized light separation variable angle element 11 (see the light "L63" and "L73").

When the TM component of the reflected laser light transmits through the polarized light separation variable angle element 11 (see the light "L64" and "L74"). After transmitting trough the polarized light separation variable angle element 11, the reflected laser light arrives at the light detector 3 (see the light "L65" and "L75"). In this wave, the object which reflects the laser light can be detected.

When the quarter-wave plate 87 is in the laser un-passage position, the laser light scanned by the polarized light separation variable angle element 11 is reflected by the object "B", and thereafter, the reflected laser light arrives at the polarized light separation variable angle element 11 (see the light "L3", "L4", "L13" and "L14" in FIG. 1), as is the case in the first example of the first embodiment. When the reflected laser light arrives at the polarized light separation variable angle element 11, the TM component of the reflected laser light transmits through the polarized light separation variable angle element 11 (see the light "L5" and "L15" in FIG. 1), and passes through the light receipt optical system 86, and thereafter, arrives at the light detector 3 (see the light "L65" and "L75"). In this way, the object which reflects the laser light can be detected.

Furthermore, based on a time difference between when the shutter of the light source 82 is opened and when the reflected laser light is detected by the light detector 83, it is possible to measure a distance to an object which reflects the laser light. According to the above radar apparatus 81, since both of the polarized light separation of the laser light and the scanning of the laser light are performed by the polarized light separation variable angle element 11, it is possible to eliminate the need for adjusting a positional relationship between an element for separating a polarized light from the laser light and an element for scanning the laser light. Furthermore, it is possible to downsize the radar apparatus 1 by reducing the number of elements of the radar apparatus 81.

Furthermore, the quarter-wave plate 87 is in the laser passage position, it is possible to detect a distance to such an object that, in reflecting the laser light, does not rotate the polarization direction of the laser light due to a surface material of the object.

In the present embodiment, the light detector 83 can correspond to a second electromagnetic wave detector. The quarter-wave plate can correspond to a polarized light converter.

(Fourth Example of First Embodiment)

A fourth example of the first embodiment will be described. A difference from the first example will be explained.

Figure 4A:
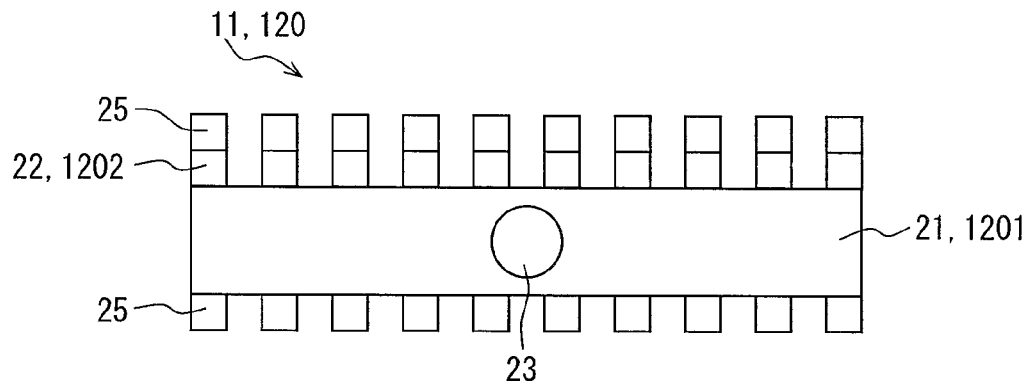
FIGS. 4A, 4B and 4C are side views of polarized light separation variable angle elements of fourth, fifth and sixth examples of the first embodiment, respectively.

The radar apparatus 1 of the fourth example can be substantially the same as that of the first example except for a structure of the polarized light separation variable angle element 11. FIG. 4A is a side view illustrating the polarized light separation variable angle element 11 of the fourth example.

As shown in FIG. 4A, the polarized light separation variable angle element 11 of the fourth example further includes a reflection suppression structure 25 as compared with the first example. The reflection suppression structure 25 has a reflection suppression function for the laser light emitted from the light source 2.

The reflection suppression structure 25 has a moth eye structure on a surface of the substrate 21. Specifically, the moth structure is formed on the polarized light separation structure 22 and further formed on a surface opposite to the polarized light separation structure 22. That is, the reflection suppression structure 25 is formed on each of opposite surfaces of the substrate 21. The reflection suppression structure 25 is arranged a a grating like the polarized light separation structure 22.

According to the above radar apparatus 1, the reflection of the laser light by the polarized light separation variable angle element 11 is suppressed and the reduction of the laser light to be detected by the light detector is not reduced. Therefore, the detection accuracy of the radar apparatus 1 improves.

(Fifth Example of First Embodiment)

A fifth example of the first embodiment will be described below. A difference from the fourth example will be mainly described.

Figure 4B:
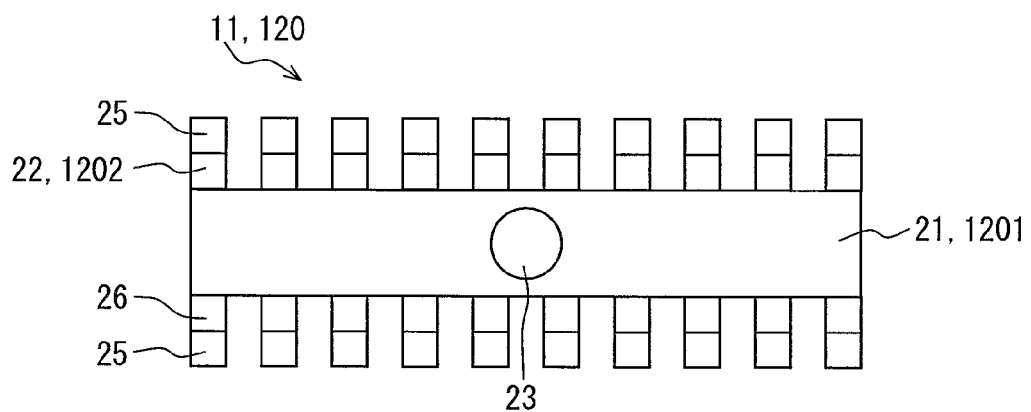

The radar apparatus 1 of the fifth example can be substantially the same as that of the fourth example except for a configuration of the polarized light separation variable angle element 11. FIG. 4B is a side view illustrating the polarized light separation variable angle element 11 of the fifth example.

As shown in FIG. 4B, the polarized light separation variable angle element 11 of the fifth example further includes a quarter-wave plate structure 26 as compared with the fourth example. The quarter-wave plate structure 26 is provided with a function of a quarter-wave plate.

The quarter-wave plate structure 26 is a diffraction grating in which a grating period is smaller than the wavelength of the laser light emitted from the light source 2. The quarter-wave plate structure 26 is arranged on one side of the substrate 21 on which the polarized light separation structure 22 is absent. The quarter-wave plate structure 26 is disposed between the substrate 21 and the reflection suppression structure 25. That is, the quarter-wave plate structure 26 is arranged as a grating, as is the case in the polarized light separation structure 22.

(Sixth Example of First Embodiment)

A sixth example of the first embodiment will be described below. A difference from the fifth example will be mainly described.

Figure 4C:
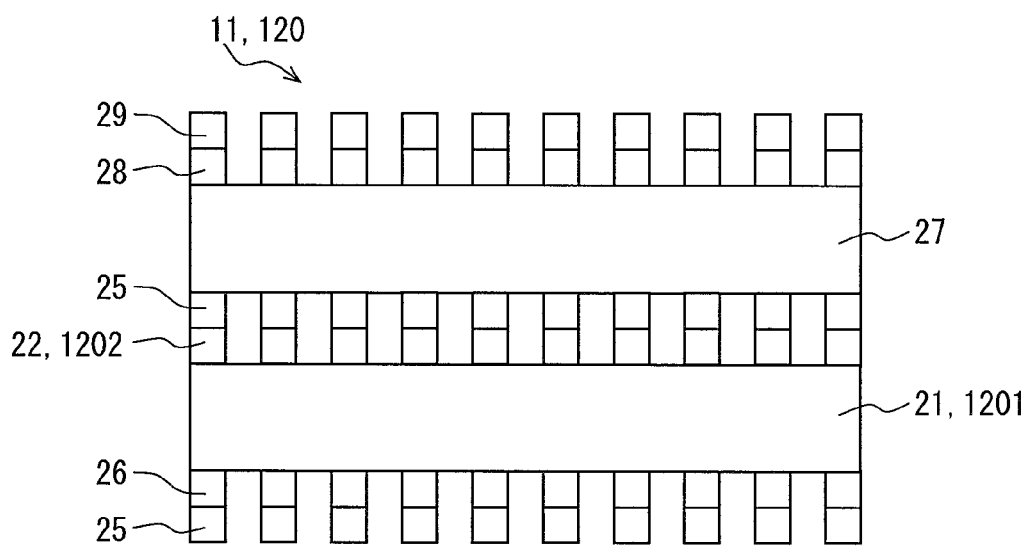

The radar apparatus 1 of the sixth example can be substantially the same as that of the fifth example except for a configuration of the polarized light separation variable angle element 11. FIG. 4C is a side view illustrating the polarized light separation variable angle element 11 of the sixth example.

As shown in FIG. 4C, the polarized light separation variable angle element 11 of the sixth example further includes a substrate 27, a polarized light separation structure 28, and a reflection suppression structure 29 as compared with the fifth example.

The substrate 27 is formed into a plate shape and made of a material transparent to the laser light, like the substrate 21 is. The substrate 27 opposes the substrate 21 through the reflection suppression structure 25. The polarized light separation structure 28 is made of the same material as the polarized light separation structure 22. The polarized light separation structure 28 is arranged on a certain surface of the substrate 27, the certain surface facing away from the substrate 21. The polarized light separation structure 28 and the reflection suppression structure 25 are arranged on opposite sides of the substrate 27.

The reflection suppression structure 29 has a moth eye structure and is arranged on the polarized light separation structure 28. The reflection suppression structure 29 is arranged as a grating like the reflection suppression structure 25.

According to the radar apparatus of the present embodiment, each of the substrate 21 and the substrate 27 has both of a polarized light separation function and a reflection suppression function. Since the number of substrates is plural, the present embodiment can improve a polarized light separation function and a reflection suppression function as compared with the use of single substrate 21.

(Seventh Example of First Embodiment)

A seventh example of the first embodiment will be described below. A difference from the seventh example will be explained.

Figure 5A:
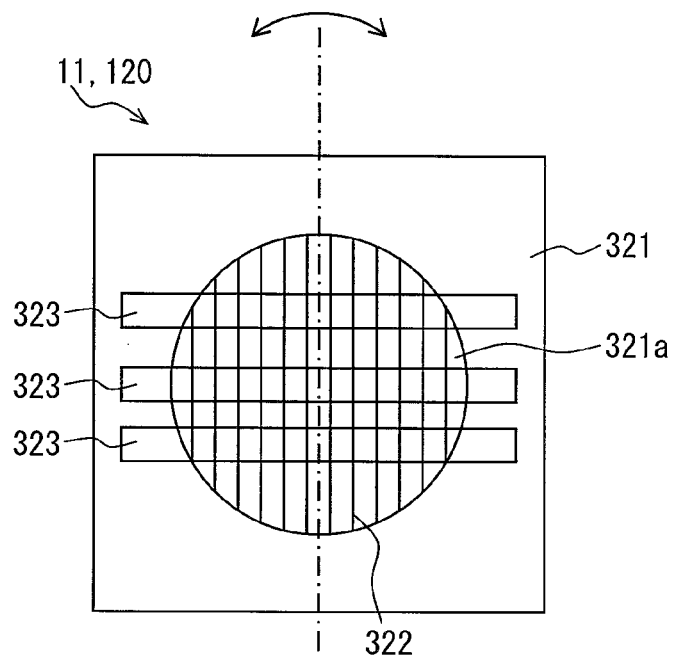
FIGS. 5A and 5B are plan views of a polarized light separation variable angle element of seventh and eighth examples of the first embodiment, respectively.

The radar apparatus 1 of the seventh example can be substantially the same as that of the first example except for a configuration of the polarized light separation variable angle element 11. FIG. 5A is a plan view illustrating the polarized light separation variable angle element 11 of the seventh example.

As shown in FIG. 5A, the polarized light separation variable angle element 11 of the seventh example includes a plate-shaped substrate 321, a polarized light separation structure 322, and a support member 323. The plate-shaped substrate 321 has an opening 321a through which the laser light passes. The polarized light separation structure 322 is arranged on the substrate 321 so as to have a polarized light separation function. The support member 323 is arranged on the substrate 321 to support the polarized light separation structure 322.

The opening 321a of the substrate 321 is circular. The polarized light separation structure 322 is formed on an open end of the opening 321a of the substrate 321. As is the case in the first example, the polarized light separation structure 322 is arranged as a grating. Specifically, multiple thin wires made of an electrically-conductive material are parallel to the preset direction (grating direction) and arranged at the predetermined intervals.

The support member 323 is made of a material transparent to the laser light. The support member 323 is elongated. The support member 323 is arranged over the open end of the opening 321a so that an elongated direction of the support member 323 is perpendicular to the grating direction. According to the radar apparatus 1 of the present embodiment, in transmitting through the polarized light separation structure 322, the TM component of the laser light passes through the opening 321a. Thus, a material of the substrate needs not be transparent to the laser light emitted from the light source 2. Therefore, the possibility of substrate material selection can be expanded.

Furthermore, because of the support member 323, the thin wires of the polarized light separation structure 322 are supported at not only a periphery of the opening 321a but also an inside of the opening 321a. Therefore, disconnection of thin wires due to weight of the thin wires can be efficiently prevented as compared with a case where the thin wires are supported at only the periphery of the opening 321a.

(Eighth Example of First Embodiment)

An eighth example of the first embodiment will be described below. A difference from the first example will be explained.

Figure 5B:
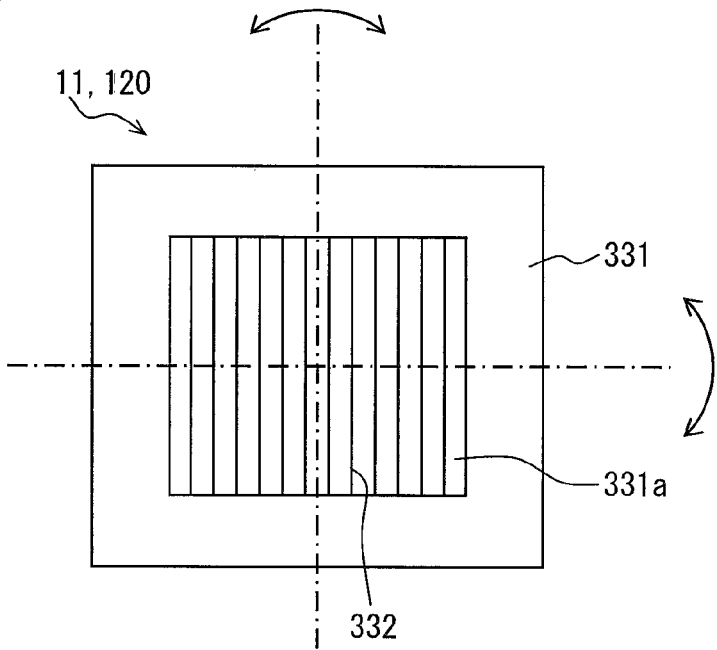

The radar apparatus 1 of the eighth example can be substantially the same as that of the first example except for a configuration of the polarized light separation variable angle element 11. FIG. 5B is a plan view illustrating polarized light separation variable angle element 11 of the eighth example.

As shown in FIG. 5B, the polarized light separation variable angle element 11 of the eighth example includes a substrate 331 and a polarized light separation structure 332. The substrate 331 has an opening 331a though which the laser light passes. The polarized light separation structure 332 is arranged on the substrate 331 so as to have a polarized light separation function.

The opening 331a of the substrate 331 is rectangular. The polarized light separation structure 332 is formed on an open end of the opening 331a of the substrate 331. As is the case in the first example, the polarized light separation structure 332 is arranged as a grating. Specifically, multiple thin wires made of an electrically-conductive material are parallel to the preset direction (grating direction) and, arranged at the predetermined intervals.

According to the radar apparatus 1 of the present embodiment, in transmitting through the polarized light separation structure 332, the TM component of the laser light passes through the opening 331a. Thus, a material of the substrate needs not be transparent to the laser light emitted from the light source 2. Therefore, it is possible to expand the possibility of substrate material selection.

The above examples of the first embodiment can be modified, combined, and extended. For example, in the first example, the one-dimensional scanning of the laser light is performed by oscillating polarized light separation variable angle element 11 around the rotation shift 23. Alternatively, the two-dimensional scanning of the laser light may be performed.

In the first example, an element that does not rotate the direction of polarization of the laser light in reflecting the laser light is used as a retroreflecting element 12. Alternatively, an element that rotates the direction of polarization of the laser light by 90 degrees in reflecting the laser light may be used as a retroreflecting element 12. In this case, the quarter-wave plate 13 can be omitted.

In the first example, the polarized light separation variable angle element 11 uses the substrate 21 made of a material transparent to the laser light emitted from the light source 2. Alternatively, the polarized light separation variable angle element 11 may use a substrate made of a material that blocks passage of the electromagnetic wave different in frequency from the electromagnetic wave emitted from the light source 2. According to this configuration, the electromagnetic wave different in frequency from the electromagnetic wave emitted from the light source 2 is prevented from transmitting through the polarized light separation variable angle element 11 and from being detected as noise. The detection accuracy of the radar apparatus 1 can improve.

Figure 6:
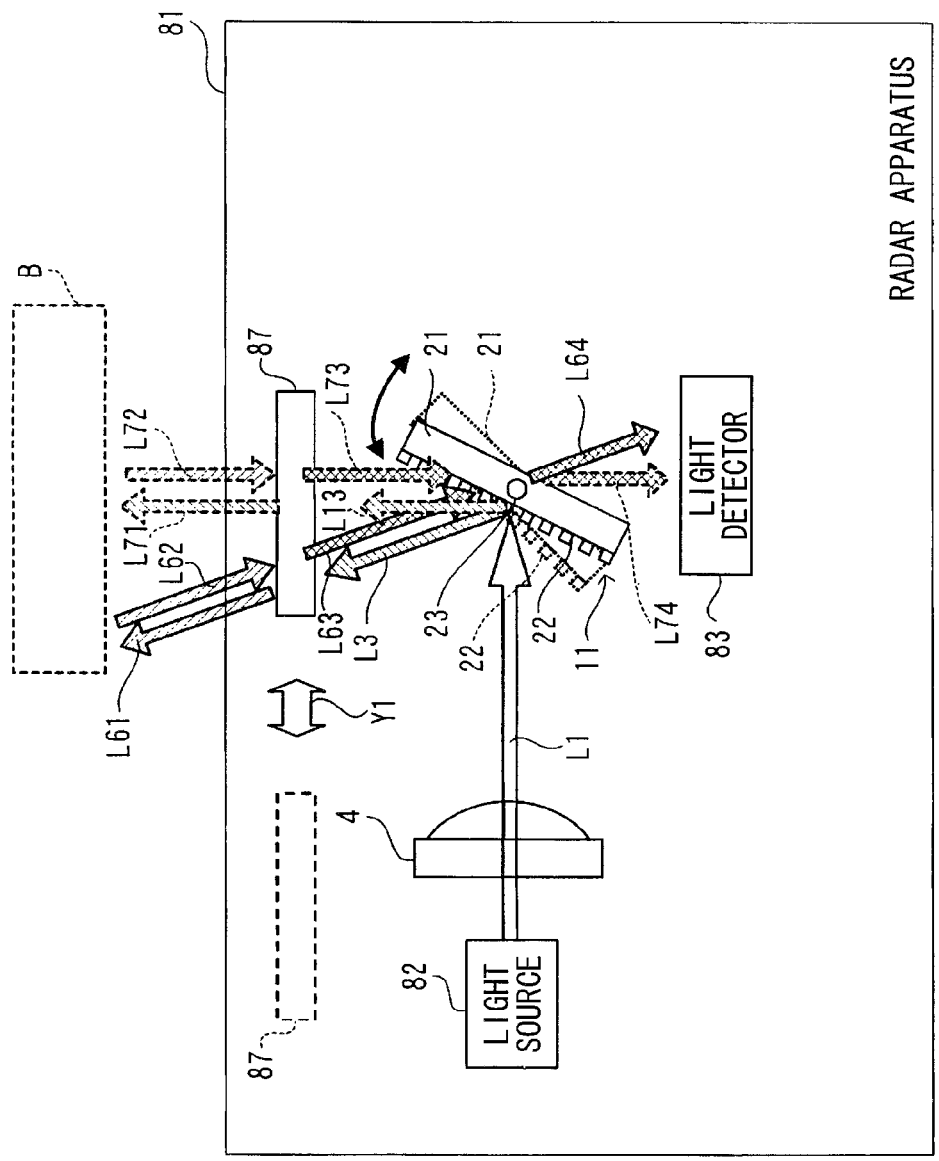
FIG. 6 is a diagram illustrating a radar apparatus of another example of the first embodiment.

In the third example, the laser light is guided to the light detector 3 via the light receipt optical system 86. Alternatively, as shown in FIG. 6, the light receipt optical system 86 may be omitted. In this case, depending on the scan angle range of polarized light separation variable angle element 11, it may be necessary to enlarge a detection surface area of the light detector 3 as compared with the third example.

In the fourth example, a member having a moth eye structure is used as a reflection suppression member. The reflection suppression member is not limited to the member having a moth eye structure. For example, dielectric multilayer films may be used as the reflection suppression member.

In the sixth example, the polarized light separation variable angle element 11 includes two stacked substrates. Alternatively, the polarized light separation variable angle element 11 may include three or more substrates stacked.

In the seventh example, the opening 321a of the substrate 321 is circular. However, the shape of the opening 321a is not limited to this example, and may be arbitrary. In the fourth example, the opening 331a of the substrate 331 is rectangular. However, the shape of the opening 331a is not limited to this example, and may be arbitrary.

[Second Embodiment]

A second embodiment will be described.

(First Example of Second Embodiment)

Figure 7:
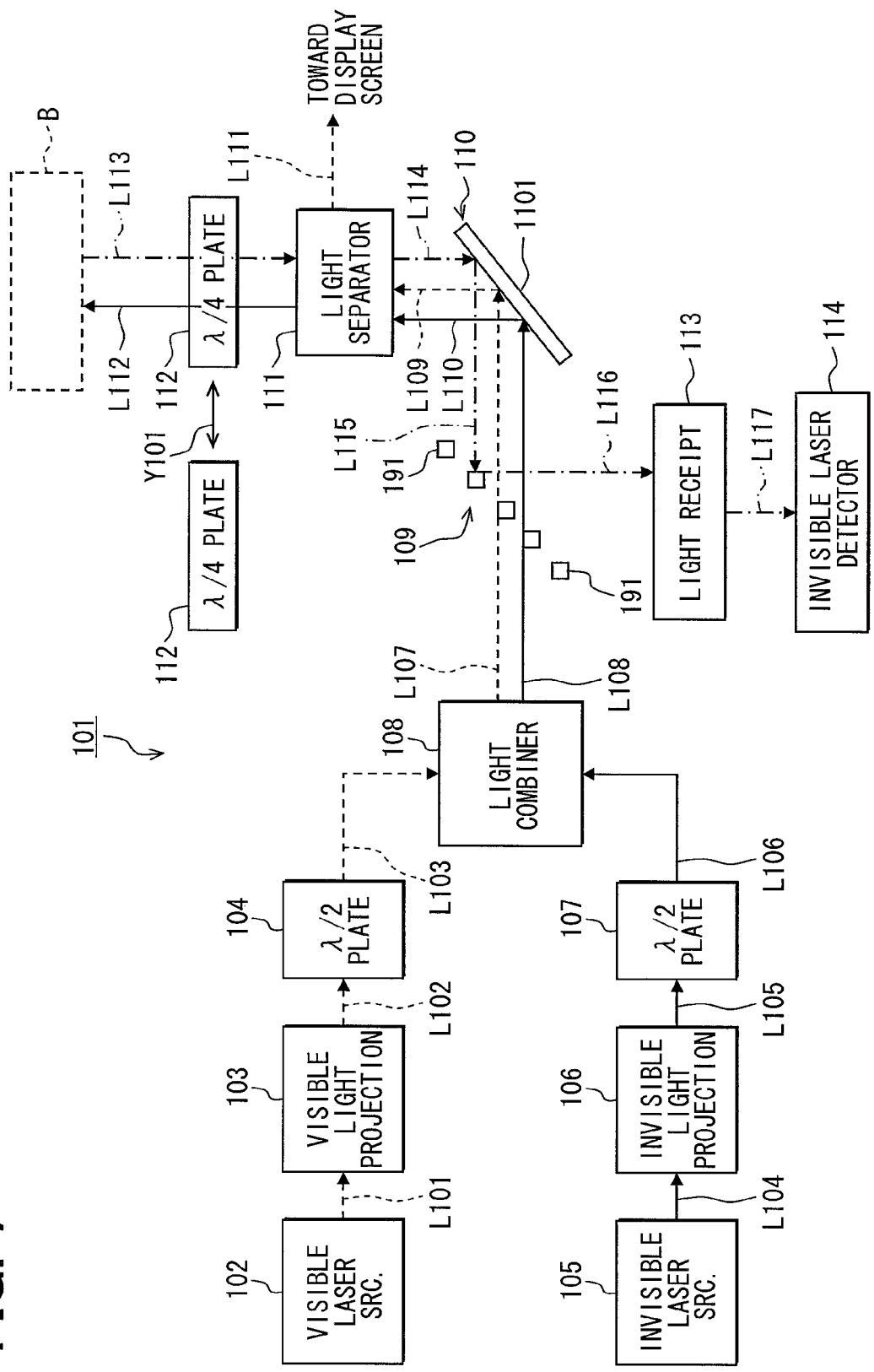
FIG. 7 is a diagram illustrating a light scan apparatus of a first example of a second embodiment.

FIG. 7 illustrates a configuration and an operation of a light scan apparatus 101 of the first example of the second embodiment.

As shown in FIG. 7, the light scan apparatus 101 is mounted to a vehicle, and includes a visible laser light source 102, a visible range light projection optical system 103, a half-wave plate 104, an invisible laser light source 105, an invisible range light projection optical system 106, a half-wave plate 107, a light combining system 108, a polarized light separation system 109, a scan optical system 110, a light separation system 111, a quarter-wave plate 112, a light receipt optical system 113, and an invisible laser detector 114.

The visible laser light source 102 includes, for example, a semiconductor laser diode and emits a laser light in a visible range. The visible range light projection optical system 103 projects the laser light, which is emitted from the visible laser light source 102, toward the light combining system 108.

The half-wave plate 104 has a function to arbitrarily change a ratio between a TE component and a TM component of the incident laser light according to an inclination angle of a reference axis of the half-wave plate 104. The half-wave plate 104 is disposed between the visible range light projection optical system 103 and the light combining system 108. In the present example, the half-wave plate 104 sends only the TM component to the light combining system 108. In the present disclosure, the TM component refers to a polarized light having a polarization direction parallel to a grating direction of the polarized light separation system 109. The TE component refers to a polarized light having a polarization direction perpendicular to the grating direction.

The invisible laser light source 105 includes, for example, a infrared laser diode and emits a pulsed laser light as a radar wave. The invisible light projection optical system 106 projects the laser light, which is emitted from the invisible laser light source 105, toward the light combining system 108.

Like the half-wave plate 104, the half-wave plate 107 has a function to arbitrarily change a ratio between the TE component and the TM component of the incident laser light according to an inclination angle of a reference axis of the half-wave plate 107. The half-wave plate 107 is disposed between the invisible range light projection optical system 106 and the light combining system 108. In the present example, the half-wave plate 107 sends only the TM component to the light combining system 108.

The light combining system 108 includes, for example, a dichroic mirror. The light combining system 108 combines the incident laser lights, which come from the light projection optical systems 103 and 106 via the half-wave plates 104 and 107. The light combining system 108 projects the combined laser light toward the polarized light separation system 109.

The polarized light separation system 109 may include the following configuration. Multiple thin wires 191 made of an electrically-conductive material (e.g., Al, Au, Ag, Cu etc.) are arranged as a grating so that the multiple thin wires 191 are parallel to a preset direction (referred to herein as "grating direction"), and that an interval of the multiple thin wires 191 is shorter than a wavelength of the laser light emitted form the light sources 102, 105. Because of this, when the laser light arrives at the polarized light separation system 109, the polarized light (TM component) having the polarization direction parallel to the grating direction transmits through the polarized light separation system 109, while the polarized light (TE component) having the polarization direction perpendicular to the grating direction is reflected by the polarized light separation system 109.

The scan optical system 110 includes a mirror 1101 for reflecting the laser light. The scan optical system 110 oscillates the mirror around two perpendicular rotation shafts (not shown). Thereby, in a predetermined scan angle range, the scan optical system 110 scans the laser beam projected from the polarized light separation system 109. A scan mechanism may include a micro electro mechanical system (MEMS), a galvanometer, or the like.

The light separation system 111 includes, for example, a dichroic mirror. The light separation system 111 reflects the light that has the same wavelength as, the laser light emitted from the visible laser lights source 102. Additionally, the light separation system 111 passes the light that has the same wavelength as the laser light emitted from the invisible laser light source 105.

The quarter-wave plate 112 converts a linearly-polarized light into a circularly-polarized light and converts the circularly-polarized light into the linearly-polarized light. The quarter-wave plate 112 is disposed on an opposite side of the light separation system 111 from the scan optical system 110. The quarter-wave plate 112 is movable between a laser passage position and a laser un-passage position (see the arrow Y101 in FIG. 7). The laser passage position is a position where the laser light scanned by the scan optical system 110 passes through the quarter-wave plate 112. The laser un-passage position is a position where the laser fight scanned by the scan optical system 110 does not pass through the quarter-wave plate 112. The motion of the quarter-wave plate 112 is controlled in the following way. When the object detection is unsuccessful as a result of the scanning of the laser light in a situation where the quarter-wave plate 112 is in the laser passage position, the quarter-wave plate 112 is moved from the laser passage position to the laser un-passage position. Inversely, when the object detection is unsuccessful as a result of the scanning of the laser light in a situation where the quarter-wave plate 112 is in the laser un-passage position, the quarter-wave plate 112 is moved from the laser un-passage position to the laser passage position.

The light receipt optical system 113 guides the incident laser light, which has traveled from the scan optical system 110 to the polarized light separation system 109 and has been reflected by the polarized light separation system 109, toward the invisible laser detector 114. The invisible laser detector 114 receives the light from the light receipt optical system 113. The invisible laser detector 114 detects the light that has the same wavelength as the light emitted from the invisible laser light source 105.

Explanation will be given on how the above light scan apparatus 101 displays an image and detects an object reflecting a radar wave.

First, the laser light emitted from the visible laser light source 102 (also referred to as visible laser light) passes through the visible range light projection optical system 103 and thereafter reaches the half-wave plate 104 (see FIG. 7 for the light L101, L102, L103). In passing through the half-wave plate 104, the laser light having the TM component and the TE component is converted to have only the TM component. The visible laser light having only the TM component is projected toward the light combining system 108 (see the light L103 in FIG. 7).

The laser light emitted from the invisible laser light source 105 (also referred to as invisible laser light) passes through the invisible light projection optical system 106 and thereafter passes through the half-wave plate 107 (see the light L104, L105, L106 in FIG. 7). In passing through the half-wave plate 107, the laser light having the TM component and the TE component is converted to have only the TM component. The invisible laser light having only the TM component is projected toward the light combining system 108 (see the light L106 in FIG. 7).

The light combining system 108 combines and projects the visible laser light and the invisible laser light toward the polarized light separation system 109. The projected laser light transmits through the polarized light separation system 109 and arrives at the scan optical system 110 (see the light L107, L108 in FIG. 7).

Upon arriving at the scan optical system 110, the visible laser light and the invisible laser light are reflected by the scan optical system 110 so that the visible laser light and the invisible laser light are scanned in a direction corresponding to the scan angle of a mirror of the scan optical system 110.

The visible laser light and the invisible laser light reflected by the scan optical system 110 arrive at the light separation system 111. By the light separation system 111, the visible laser light is reflected and scanned across a display screen (e.g., an instrument panel cover, a windshield, a pillar etc.), so that the image is displayed on the display screen.

Upon arriving at the light separation system 111, the invisible laser light transmits through the light separation system 111 and is emitted as the radar wave in the direction corresponding to the scan angle of the mirror of the scan optical system 110.

When the quarter-wave plate 112 is in the laser passage position, the scanned laser light passes through the quarter-wave plate 112. In passing the quarter-wave plate 112, the scanned laser light is converted from the linearly-polarized light into the circularly polarized light. Thereafter, the scanned laser light arrives at the object (light L112 in FIG. 7). In the above, in reflecting the laser light, the object "B" may not rotate the polarization direction of the laser light because of its surface material (e.g., cat's-eye). The laser light reflected by the object "B" (i.e., reflected laser light) passes through the quarter-wave plate 112 again. Thus, the laser light is converted into the TE component. This converted laser light transmits through the light separation system 111 and arrives at the scan optical system 110 (see the light "L114" in FIG. 7).

The reflected laser light, which is the TE component, is reflected by the scan optical system 110 (see the light "L115" in FIG. 7) and then projected toward the polarized light separation system 109. Upon arriving at the polarized light separation system 109, the reflect laser light, which is the TE component, is reflected by the polarized light separation system 109 and projected toward the light receipt optical system 113 (see the light L116 in FIG. 7). In this way, the reflected laser light arrives at the invisible laser detector 114. The object that reflects the laser light can be detected.

When the quarter-wave plate 112 is in the laser un-passage position, the laser right scanned by the scan optical system 110 is reflected by the object "B". Thereafter, the reflected laser light transmits through the light separation system 111 and arrives at the scan optical system 110 (see the light "L112", "L113", and "L114" in FIG. 7). It should be noted that although the laser light reflected by the scan optical system 110 and sent as the radar wave is made of TM component, the laser light reflected by the object "B" contains not only the TM component but also the TE component because of random reflection by the object "B", Upon reaching the scan optical system 110, the reflected laser light is reflected by the scan optical system 110 (see the light "L115" in FIG. 7) and is projected toward the polarized light separation system 109. Upon reaching the polarized light separation system 109, the TE component of the incident light is reflected by the polarized light separation system 109 and is projected toward the light receipt optical system 113 (see the light L116 in FIG. 7). In this way, the reflected laser light arrives at the invisible laser detector 114 (see the light "L117). The object that reflects the laser light can be detected.

Specifically, based on a time difference between the emission of the pulsed laser light by the invisible laser light source 105 and the detection of the reflected laser light by the invisible laser detector 114, it is possible to detect the distance to the object that reflects the laser light.

In the above light scan apparatus 101, the visible laser light source 102 emits the visible laser light; and additionally, the invisible laser light source 105 emits the invisible laser light. The light combining system 108 combines the visible laser light emitted from the visible laser light source 102 and the invisible laser light emitted from the invisible laser light source 105, and projects the combined laser light toward the polarized light separation system 109. Thereafter, when the combined laser light reaches the polarized light separation system 109, the TM component of the combined laser light transmits through the polarized light separation system 109. Thereafter, the TM component is reflected by the scan optical system 110 and sent toward the light separation system 111, such that the scan optical system 110 scans the TM component in a predetermined range of scan angle. The light separation system 111 is configured to pass a first part of the incident light and reflect a second part of the incident light. The first part is a light that has the same wavelength as the invisible laser light emitted from the invisible laser light source 105. The second part is a light that has the same wavelength as the visible laser light emitted from the visible laser light source 102.

Because of the above, the visible laser light reflected by the light separation system 111 can be scanned at an angle corresponding to the scan angle of the scan optical system 110. Thus, depending on the scan angle of the scan optical system 110, it is possible to control whether to irradiate with the visible laser light. Additionally, it is possible to control the color of the visible laser light. In this way, an image display is performed.

Moreover, the invisible laser light transmitting through the light separation system 111 can be scanned at the angle corresponding to the scan angle of the scan optical system 110, the invisible laser light can be used as the radar wave for detecting an object that is located on an opposite side of the light separation system 111 from the scan optical system 110.

The light reflected by the object reaches the scan optical system 110. The scan optical system 110 reflects this incident light toward the polarized light separation system 109. When the reflected light arrives at the polarized light separation system 109, the TE component of the incident light is reflected by the polarized light separation system 109 toward the invisible laser detector 114. The invisible laser detector 114 detects the incident light that has the same wavelength as the invisible laser light emitted from the invisible laser light source 105.

In this way, the laser light reflected by the object can be detected. Additionally, based on the time difference between the emission of the invisible laser light by the invisible laser light source 105 and the detection of the invisible laser light by the invisible laser detector 114, it is possible to measure a distance to the object that reflects the laser light.

In the above described light scan apparatus 101, the visible laser light for displaying an image and the invisible laser light for detecting an object are scanned with use of the polarized light separation system 109 and the scan optical system 110. That is, a scanning means is shared by an image display mechanism and an object detection mechanism. Therefore, the number of elements of the light scan apparatus 101 and the size of the light scan apparatus 101 can be reduced as compared with a case where a scanning means for image display is separated from a scanning means for object detection.

In the light scan apparatus 101, since the light combining system 108 combines the visible laser light and the invisible laser light, an optical axis adjustment between the light combining system 108 and the scan optical system 110 is needed. However, it is unnecessary to perform both of an optical axis adjustment for the visible laser light and an optical axis adjustment for the invisible laser light. Thus, an amount of work for the optical axis adjustment can be reduced as compared with cases where a means fro scanning the visible laser light is separated from a means fro scanning the invisible laser light.

In the present first example of the second embodiment, the visible laser light source 102 can correspond to a visible light emitter. The invisible laser light source 105 can correspond to an invisible light emitter. The light combining system 108 can correspond to a light combiner. The light separation system 111 can correspond to a light separator. The invisible laser detector 114 can correspond to an invisible laser detection means. The polarized light separation system 109 and the scan optical system 110 can correspond to a polarized light scan part or means. The TM component can correspond to a first polarized light. The TE component can correspond to a second polarized light.

(Second Example of Second Embodiment)

A second example of the second embodiment will be described.

Figure 8:
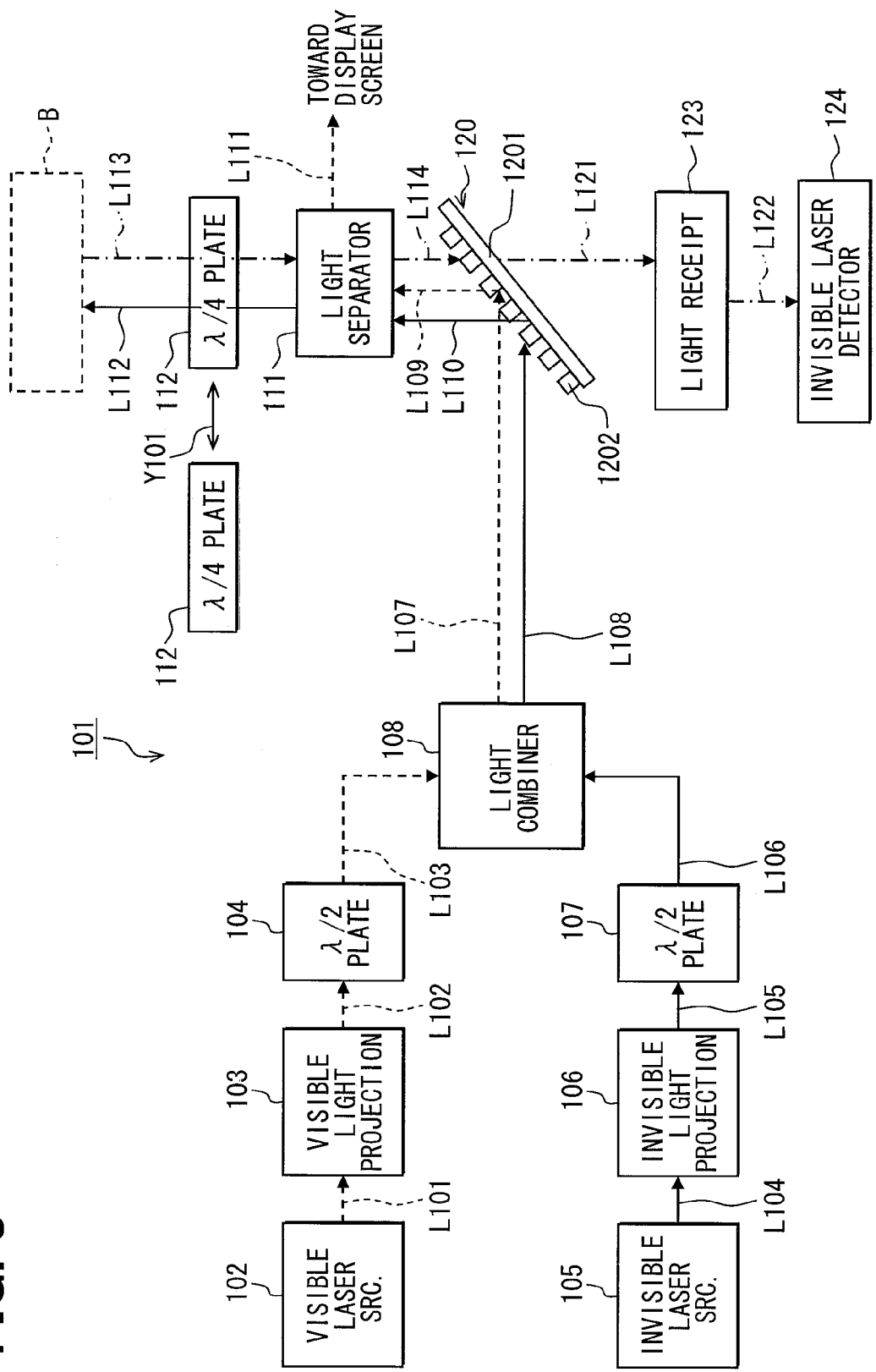
FIG. 8 is a diagram illustrating a light scan apparatus of a second example of the second embodiment.

FIG. 8 illustrates a configuration and an operation of a light scan apparatus 101 of the second example of the second embodiment. As shown in FIG. 8, the second example differs from that of the first example in the following. The polarized light separation system 109 is omitted. A polarized light separation variable angle element 120 is provided in place of the scan optical system 110. A light receipt optical system 123 and an invisible laser detector 124 are provided in place of the light receipt optical system 113 and the invisible laser detector 114.

The polarized light separation variable angle element 120 includes a substrate 1201 and a polarized light separation structure 1202. The substrate 1201 is made of a material transparent to a laser light. The polarized light separation structure 1202 is formed on a surface of the substrate 1201 so that the polarized light separation structure 1202 has a function of polarized light separation.

The polarized light separation structure 1202 includes multiple thin wires which are made of an electrically conductive material such as Al, Au, Ag, Cu etc., and are arranged at predetermined intervals. Specifically, the multiple thin wires are parallel to a preset direction (grating direction) and the predetermined interval is smaller than the wavelength of the laser light emitted from the light source 102, 105. The polarized light separation structure 1202 is arranged as a grating. The grating direction of the polarized light separation structure 1202 is the same as the grating direction of the polarized light separation system 109 of the first example. A TM component transmittance and a TE component transmittance, which depend on wavelength, can be changed according to shape of the micro periodic structure of the multiple thin wires and/or the physical property of the electrically conductive material.

The polarized light separation variable angle element 120 oscillates around two rotation shafts (not shown) when being supplied with a driving force from a driving source (not shown). The polarized light separation variable angle element 120 thereby performs the two-dimensional scan of a laser light projected from the polarized light separation system 109. The two rotation shafts are perpendicular to each other and provided on the substrate 1201. The two-dimensional scan of a laser light is performed in a predetermined scan angle range. A scan mechanism may include a micro electro mechanical system (MEMS), a galvanometer, or the like.

The laser light coming from the light separation system 111 transmits through the polarized light separation variable angle element 120. This laser light is guided by the light receipt optical system 123 toward the invisible laser detector 124. When the light coming from the light receipt optical system 123 is incident on the invisible laser detector 124, the invisible laser detector 124 detects the incident light that has the same wavelength as the laser light emitted from the invisible laser light source 105.

In the present example, the TM component refers to a component with a polarization direction parallel to the grating direction of the polarized light separation variable angle element 120. The TE component refers to a component with a polarization direction perpendicular to the grating direction of the polarized light separation variable angle element 120. In the present embodiment, the half-wave plates 104 and 107 project only the TE component toward the light combining system 108.

Explanation will be given on how the above light scan apparatus 101 displays an image and detects an object reflecting a radar wave. As is the case in the first example of the second embodiment, the light combining system 108 combines the visible laser light and the invisible laser light, and projects the combined visible and invisible laser lights toward the polarized light separation variable angle element 120 (see the light "L107" and "L108" in FIG. 8).

The visible and invisible laser lights reaching the polarized light separation variable angle element 120 have only the TE component out of the TM component and the TE component.

Thus, the visible and invisible laser lights are reflected by the polarized light separation variable angle element 120 and scanned at an angle corresponding to the scan angle of the polarized light separation variable angle element 120 (see the light "L109" and "L110" in FIG. 8).

The visible and invisible laser lights reflected by polarized light separation variable angle element 120 arrive at the light separation system 111. The light separation system 111 reflects the visible light while scanning the visible light on a preset display screen, so that an image is displayed on the display screen (see the light "L111" in FIG. 8).

The invisible light arriving at the light separation system 111 transmits through the light separation system 111 and is emitted as the radar wave in the direction corresponding to the scan angle of the mirror of the scan optical system 110 (see the light "L112 in FIG. 8").

Thereafter, the TM component reflected by the object "B" arrives at the scan optical system 110, as is the case in the first example. This TM component transmits through the polarized light separation variable angle element 120 and is projected toward the light receipt optical system 123 (see the light L121 in FIG. 8). In this way, the reflected laser light arrives at the invisible laser detector 124 (see the light L122). The object which reflects the laser light can be detected.

Furthermore, the distance to the object which reflects the laser light can be measured based on a difference between the time of emission of the pulsed laser light by the invisible laser light source 105 and the time of detection of the reflected laser light by the invisible laser detector 124.

In the above light scan apparatus 101, both of the separating of the polarized light from the laser light and the scanning of the laser light are performed in the polarized light separation variable angle element 120. Therefore, it is possible to eliminate the need for adjustment of a positional relationship between an element for separating the polarized light from the laser light and an element for scanning the laser light. Additionally, because of the reduction of the number of elements, it is possible to easily downsize the light scan apparatus 101.

The polarized light separation variable angle element 120 includes multiple thin wires, which are made of an electrically conductive material, parallel to the preset direction (grating direction), and are arranged at predetermined intervals. Because of this, a grating structure can be formed with use of a micro processing technique. Therefore, the polarized light separation variable angle element 120 can be downsized as compared with a conventional polarized light separation member, which is, for example, formed by bonding right angle prisms into a cubic form.

In the present example, the polarized light separation variable angle element 120 can correspond to a polarized light scan part or means. The substrate 1201 and the polarized light separation structure 1202 can correspond to a polarized light separation member. The rotation shaft provided to the polarized light separation variable angle element 120 can correspond to a predetermined rotation axis. The invisible laser detector 124 can correspond to an invisible light detector. The TE component can correspond to a first polarized light. The TM component can correspond to a second polarized light.

(Third Example of Second Embodiment)

A third example of the second embodiment will be described with reference to the accompanying drawings.

Figure 9:
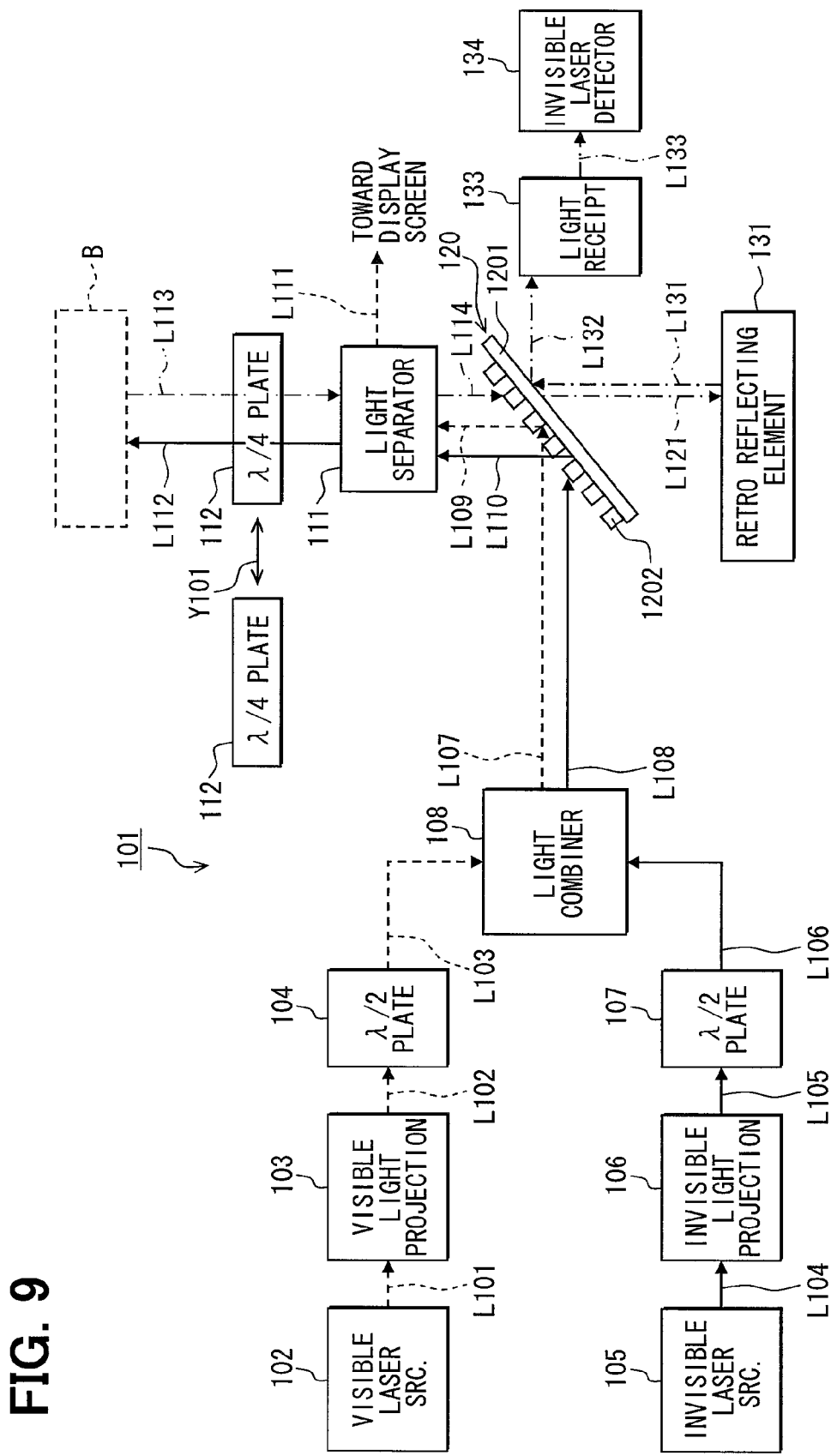
FIG. 9 is a diagram illustrating a light scan apparatus of a third example of the second embodiment.

FIG. 9 illustrates a configuration and an operation of a light scan apparatus 101 of the third example of the second embodiment. The third example differs from the second example in the following. A retroreflecting element 131 is added. A light receipt optical system 133 and an invisible laser detector 134 are provided in place of the light receipt optical system 123 and the invisible laser detector 124.

The retroreflecting element 131 has a function to reflect an incident light in a direction opposite to the incident direction of the incident light. The retroreflecting element 131 is disposed on an opposite side of the polarized light separation variable angle element 120 from the light separation system 111. The reflected laser light that comes from the light separation system 111 and passes through the polarized light separation variable angle element 120 is reflected by the retroreflecting element 131.

The light receipt optical system 133 is disposed on an opposite side of the polarized light separation variable angle element 120 from the light combining system 108. The laser light that has come from the retroreflecting element 131 and has reflected by the polarized light separation variable angle element 120 is guided toward the invisible laser detector 134 by the light receipt optical system 133.

The invisible laser detector 134 receives the light from the light receipt optical system 133. The invisible laser detector 134 detects a predetermine part of the incident light. The predetermined part is a light that has the same wavelength as the laser light emitted from the invisible laser light source 105.

Explanation will be given on how the above light scan apparatus 101 displays an image and detects an object reflecting a radar wave.

First, the light combining system 108 combines the visible laser light and the invisible laser light, and projects the combined light toward the polarized light separation system 109, as is the case in the second example. The combined light is reflected by the polarized light separation variable angle element 120 and is scanned in a direction corresponding to the scan angle of the polarized light separation variable angle element 120 (see the light L109 and L110 in FIG. 9).

The visible laser light and invisible laser light reflected by the polarized light separation variable angle element 120 are incident on the light separation system 111. The light separation system 111 reflects the visible laser light and scans the visible laser light on the preset display screen, thereby displaying the image on the display screen (see the light L111 in FIG. 9).

The invisible light incident on the light separation system 111 transmits through the light separation system 111 and is emitted as the radar wave in the direction corresponding to the scan angle of the mirror of the scan optical system 110.

Thereafter, as is the case in the second example, the TM component of the reflected laser light, which is reflected by the object "B" and the incident on the scan optical system 110, transmits through the polarized light separation variable angle element 120 and is projected toward the retroreflecting element 131 (see the light L121 in FIG. 9).

The retroreflecting element 131 reflects the incident laser light in the direction opposite to the incident direction while converting the incident laser light into the TE component. Thereafter, the TE component is incident on the polarized light separation variable angle element 120.

The TE component is reflected by the polarized light separation variable angle element 120 and is projected toward the light receipt optical system 133 (see the light L132 in FIG. 9).

In this way, the reflected laser light arrives at the invisible laser detector 134 (see the light L133 in FIG. 9). The object which has reflected the radar wave can be detected (see the light L133 in FIG. 9).

Furthermore, the distance to the object which reflects the laser light can be measured based on a difference between the time of emission of the pulsed laser light by the invisible laser light source 105 and the time of detection of the reflected laser light by the invisible laser detector 134.

In the above light scan apparatus 101, the laser light reflected by the object "B" (i.e., the TM component) transmits through the polarized light separation variable angle element 120, and is incident on the retroreflecting element 131. The retroreflecting element 131 reflects this incident laser light toward the polarized light separation variable angle element 120 while converting into the TE component. The laser light reflected by the retroreflecting element 131 is reflected by the polarized light separation variable angle element 120, and is detected by the invisible laser detector 134, which is located on an opposite side of the polarized light separation variable angle element 120 from the light combining system 108.

In the above light scan apparatus 101, the invisible laser detector 134 for detecting the laser light reflected by the object "B" is not limited to being located on an opposite side of the polarized light separation variable angle element 120 from the object "B". Therefore, the third example of the second embodiment has high flexibility in location of the invisible laser detector 134, as compared with the second example.

In the third example, the retroreflecting element 131 can correspond to a conversion reflector. The invisible laser detector 134 can correspond to an invisible light detector.

(Fourth Example of Second Embodiment)

A fourth example of the second embodiment will be described.

Figure 10:
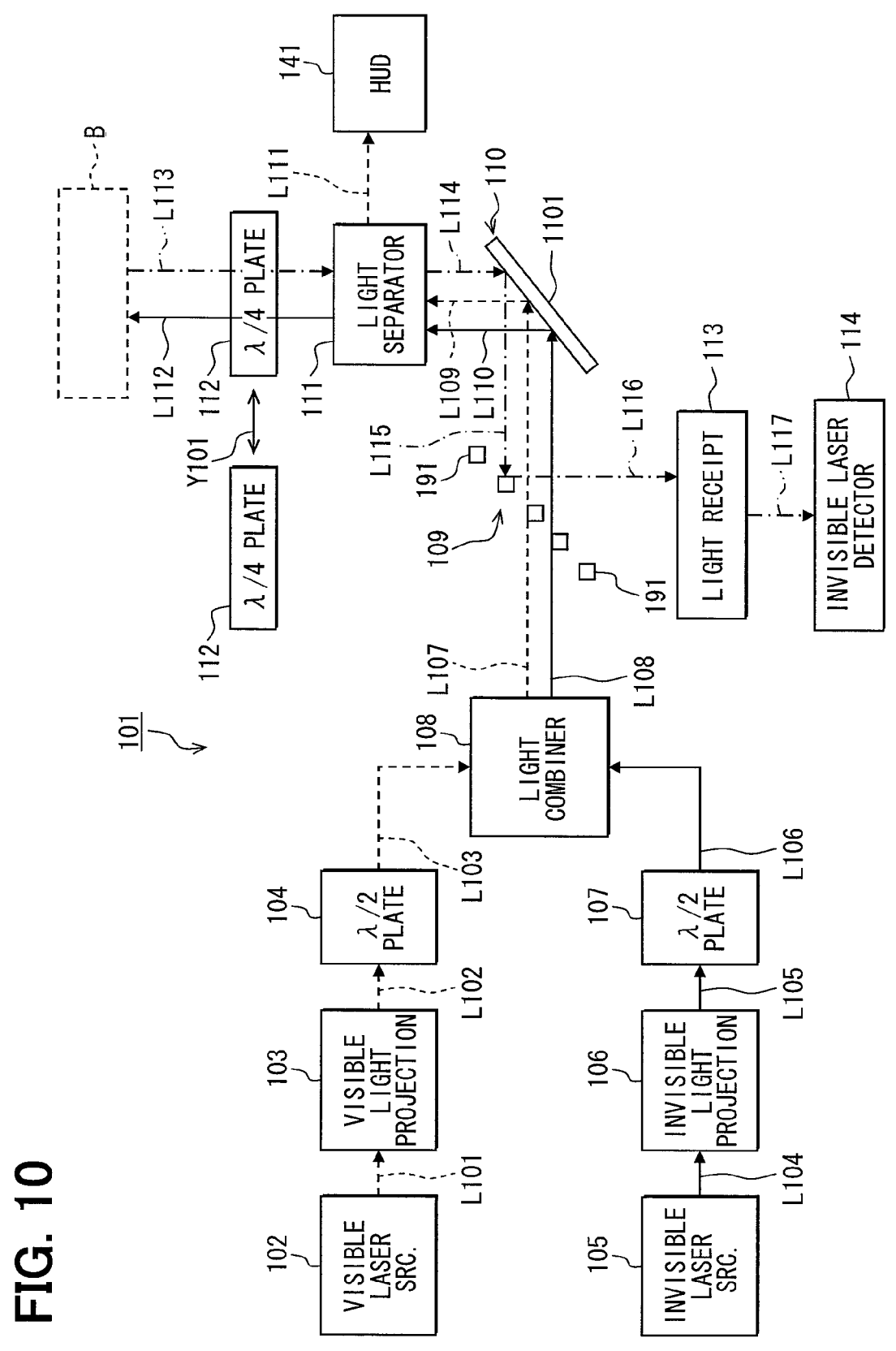

FIG. 10 illustrates a configuration and an operation of a light scan apparatus 101 of the fourth example of the second embodiment.

The fourth example can be substantially the same as the first example except for addition of a head-up display device, as shown in FIG. 10.

The head-up display device 141 (also called "HUD device") is mounted to a vehicle and may be installed to an inside of an instrumental panel. The HUD device 141 includes a screen (not shown) and a magnification optical system (not shown). The screen can act as a display screen for an image when the laser light reflected by the light separation system 111 is scanned. The magnification optical system magnifies the image projected on the screen and emits the magnified image toward a windshield. The HUD device 141 irradiates the windshield with a display light from a low side of the windshield. In the above, the display light is a light for displaying the image, which is formed by the visible laser light reflected by the light separation system 111. A driver seated on a driver seat in a vehicle compartment can see a projected virtual image so that the projected virtual image overlaps actual scenery.

According to the present example, when a radar for detecting an object in front of a vehicle and the HUD device for displaying a virtual image to an occupant of the vehicle are mounted to the vehicle, the light scan apparatus 101 has an optical system for the radar and the HUD device.

(Fifth Example of Second Embodiment)

A fifth example of the second embodiment will be described below.

Figure 11:
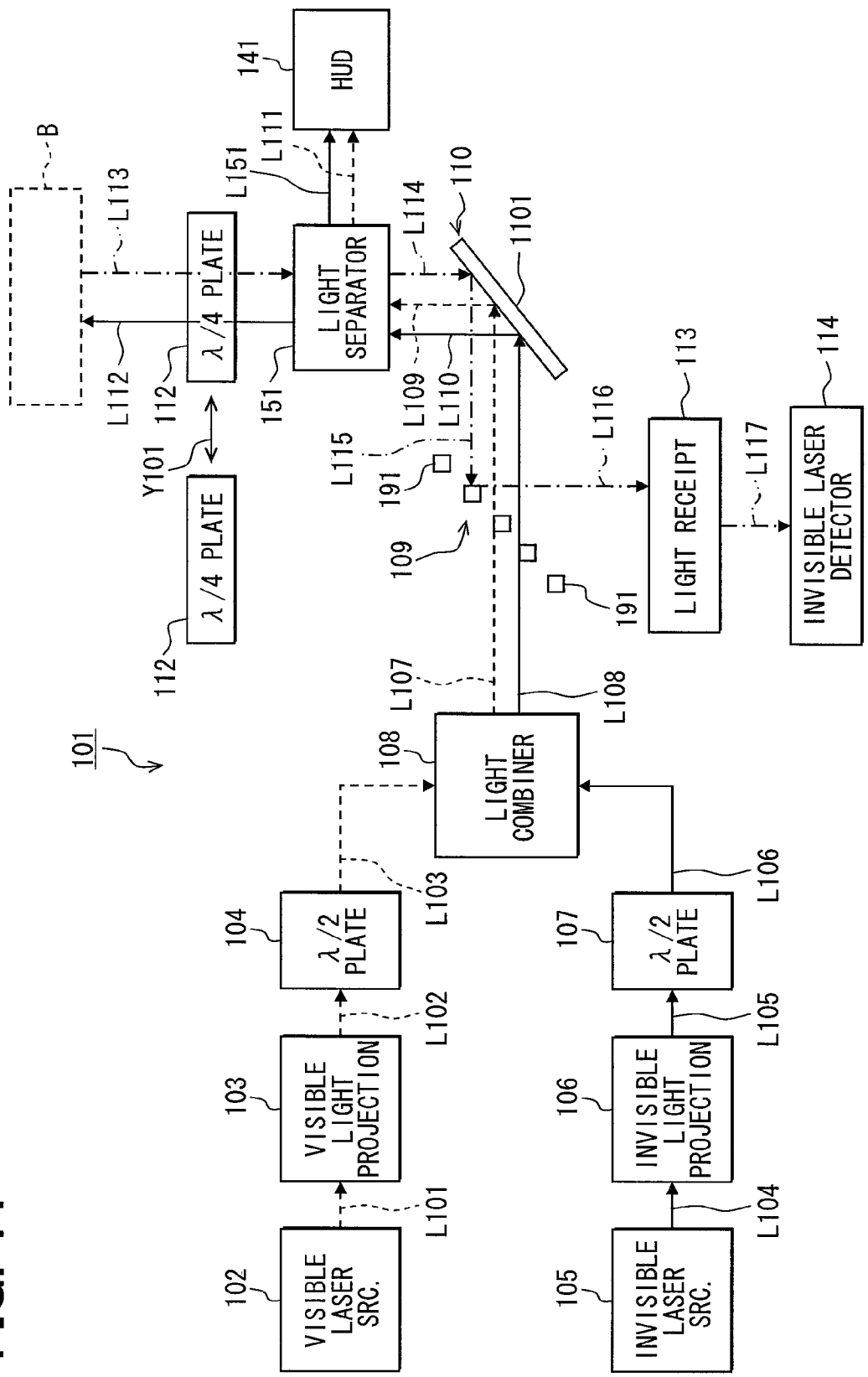
FIG. 11 is a diagram illustrating a light scan apparatus of a fifth example of the second embodiment.

FIG. 11 illustrates a configuration and an operation of a light scan apparatus 101 of the fifth example of the second embodiment. The fifth example can be substantially the same as the fourth example except that a light separation system 151 is used in place of the light separation system 111, as shown in FIG. 11.

The light separation system 151 reflects a light that has the same wavelength as the laser light emitted from the visible laser light source 102. As for the light having the same wavelength as the laser light emitted from the invisible laser light source 105, the light separation system 151 reflects a part of the laser light (e.g., 30%) and passes the rest of the laser light (e.g., 70%).

In the HUD device 141, the invisible laser light reflected by the light separation system 151, is projected onto the screen and emitted toward the windshield through the magnification optical system. Thereafter, the invisible laser light from the HUD device 141 is reflected by the windshield. Accordingly, the driver's face is irradiated with the invisible laser light with uniform intensity.

According to this configuration, since the windshield of the vehicle is irradiated with the invisible laser light, the driver's face can be irradiated with the invisible laser light reflected by the windshield. The driver's face irradiated with the invisible laser light can be imaged with an invisible light imaging device (e.g., camera), so that the gaze of the driver is detected. Therefore, the invisible laser light for detecting an object in front of the vehicle can be also used to detect the gaze of the driver.

In the present example, the light separator can correspond to a light reflector.

(Sixth Example of Second Embodiment)

A sixth example of the second embodiment will be described below.

The sixth example can be substantially the same as the fifth embodiment except for a configuration of the polarized light separation variable angle element 120. FIG. 4A is a side view illustrating a polarized light separation variable angle element 120 of the sixth example.

As shown in FIG. 4A, the polarized light separation variable angle element 120 further includes a reflection suppression structure 25, as compared with the second example of the second embodiment. The reflection suppression structure 25 has a reflection suppression function for the laser light emitted from the light source 105.

The reflection suppression structure 25 has a moth eye structure on a surface of the substrate 1201. Specifically, the moth structure is formed on the polarized light separation structure 1202 and further formed on a surface opposite to the polarized light separation structure 1202. That is, the reflection suppression structure 25 is formed on opposite surfaces of the substrate 1201. The reflection suppression structure 25 is arranged as a grating like the polarized light separation structure 1202.

According to the above light scan apparatus 101, the reflection of the laser light by the polarized light separation variable angle element 120 is suppressed. As a result, the reduction of the laser light to be detected by the invisible light detector 124 is not reduced. Therefore, the detection accuracy of the light scan apparatus 101 improves.

(Seventh Example of Second Embodiment)

A seventh example of the second embodiment will be described below.

The seventh example can be substantially the same as the sixth embodiment except for a configuration of the polarized light separation variable angle element 120. FIG. 4B is a side view illustrating the polarized light separation variable angle element 120.

As shown in FIG. 4B, the polarized light separation variable angle element 120 further includes a quarter-wave plate structure 26 as compared with the sixth example. The quarter-wave plate structure 26 is a structure having a function of a quarter-wave plate.

The quarter-wave plate structure 26 is a diffraction grating in which a grating period is smaller than the wavelength of the laser light emitted from the light source 102, 105. The quarter-wave plate structure 26 is arranged on one side of the substrate 1201 on which a polarized light separation structure 22 is absent. The quarter-wave plate structure 26 is between the substrate 1201 and the reflection suppression structure 25. That is, the quarter-wave plate structure 26 is arranged into a grating like the polarized light separation structure 22

(Eighth Example of Second Embodiment)

An eighth example of the second embodiment will be described below.

The eighth example can be substantially the same as the seventh example except for a configuration of the polarized light separation variable angle element 120. FIG. 4C is a side view illustrating the polarized light separation variable angle element 120.

As shown in FIG. 4C, the polarized light separation variable angle element 120 further includes a substrate 27, a polarized light separation structure 28, and a reflection suppression structure 29, as compared with the seventh example.

The substrate 27 is formed into a plate shape and made of a material transparent to a laser light, like the substrate 1201 is. The substrate 27 opposes the substrate 1201 through the reflection suppression structure 25. The polarized light separation structure 28 is made of the same material as the polarized light separation structure 1202. The polarized light separation structure 28 is arranged on a surface of the substrate 27, which surface faces away from the substrate 1201. The polarized light separation structure 28 and the reflection suppression structure 25 are arranged on opposite sides of the substrate 27.

The reflection suppression structure 29 has a moth eye structure, and is arranged on the polarized light separation structure 28. The reflection suppression structure 29 is arranged as a grating like the reflection suppression structure 25.

According to the light scan apparatus 101 of the present example, each of the substrate 1201 and the substrate 27 has both of a polarized light separation function and a reflection suppression function. Thus, since the number of substrates is plural, the present example can improve a polarized light separation function and a reflection suppression function as compared with the use of a single substrate 1201.

(Ninth Example of Second Embodiment)

A ninth example of the second embodiment will be described below.

The ninth example can be substantially the same as the second example except for a configuration of the polarized light separation variable angle element 120.

FIG. 5A is a plan view illustrating the polarized light separation variable angle element 120 of the ninth embodiment.

As shown in FIG. 5A, the polarized light separation variable angle element 120 of the ninth example includes a plate-shaped substrate 321, a polarized light separation structure 322, and a support member 323. The plate-shaped substrate 321 has an opening 321a through which a laser light passes. The polarized light separation structure 322 is arranged on the substrate 321 so as to have a polarized light separation function. The support member 323 is arranged on the substrate 1201 to support the polarized light separation structure 322.

The opening 321a of the substrate 321 is circular. The polarized light separation structure 322 is formed on an open end of the opening 321a of the substrate 321. As is the case in the second example, the polarized light separation structure 322 is arranged as a grating. Specifically, multiple thin wires made of an electrically-conductive material are arranged at the predetermined intervals so as to be parallel to the preset direction (grating direction).

The support member 323 is made of a material transparent to the laser light. The support member 323 is elongated. The support member 323 is arranged over the open end of the opening 321a so that an elongated direction of the support member 323 is perpendicular to the grating direction. According to the light scan apparatus 101 of the present example, in transmitting through the polarized light separation structure 322, the laser light through the opening 321a. Thus, a material of the substrate needs not be transparent to the laser beam emitted from the light source 102, 105, and therefore, it is possible to increase the substrate material selection flexibility.

Furthermore, because of the support member 323, the thin wires of the polarized light separation structure 322 are supported at not only a periphery of the opening 321a but also an inside of the opening 321a. Therefore, disconnection of thin wires due to weight of the thin wires can be efficiently prevented as compared with a case where the thin wires are supported at only the periphery of the opening 321a.

(Tenth Example of Second Embodiment)

A tenth example of the second embodiment will be described below.

The tenth example can be substantially the second example except for a configuration of the polarized light separation variable angle element 120. FIG. 5B is a plan view illustrating the polarized light separation variable angle element 120 of the tenth embodiment.

As shown in FIG. 5B, the polarized light separation variable angle element 120 of the eighth embodiment includes a substrate 331 and a polarized light separation structure 332. The substrate 331 has an opening 331a though which the laser light passes. The polarized light separation structure 332 is arranged on the substrate 331 so as to have a polarized light separation function.

The opening 331a of the substrate 331 is rectangular. The polarized light separation structure 332 is formed on an open end of the opening 331a of the substrate 331. As is the case in the second example, the polarized light separation structure 132 is arranged as a grating. Specifically, multiple thin wires made of an electrically-conductive material are arranged at the predetermined intervals, so that the multiple thin wires are parallel to the preset direction (grating direction) and extend between two opposing edges of the four edges of the rectangular opening 331a.

According to the light scan apparatus 101 of the present example, in transmitting through the polarized light separation structure 132, the laser light passes through the opening 321a. Thus, a material of the substrate needs not be transparent to the laser light emitted from the light source 102, 105. Therefore, it is possible to increase the substrate material selection flexibility.

The second embodiment is not limited to the above-described examples, and can have various forms. Examples are as follows. In the first example, each of the light combining system 108 and the light separation system 111 includes a dichroic mirror. Alternatively, each of the light combining system 108 and the light separation system 111 may include a diffractive optical element (DOE), a holographic optical element (HOE), or the like.

In the first example, the polarized light separation system 109 includes multiple thin wires 191 arranged as a grating. Alternatively, the polarized light separation system 109 may include a prism with multilayer dielectric films.

The first example includes the half-wave plate and the quarter-wave plate. Alternatively, an element with functions corresponding to the half-wave plate and the quarter-wave plate may be used in place of the half-wave plate and the quarter-wave plate. For example, an electro-optic modulator (EOM), a liquid crystal (LC), and a sub-wavelength structure (SWS) may be used.

In the fourth and fifth examples, the HUD device 141 and the light separation system 151 are applied to the first example. Alternatively, the HUD device 141 and the light separation system 151 may be applied to the second embodiment.

In the second example, the substrate 1201 of the polarized light separation variable angle element 120 is made of a material transparent to the laser light emitted from the light source 102, 105. Alternatively, the substrate may be made of such a material that the light different in wavelength from the laser light emitted from the invisible laser light source 105 is blocked from passing through the substrate. In this configuration, the light s different in wavelength from the laser light emitted from the invisible laser light source 105 does not transmit through the polarized light separation variable angle element 120, and is not detected as noise by the invisible light detector 124. Detection accuracy of the invisible light detector 124 improves.

In the sixth example, a member having a moth eye structure is used as a reflection suppression member. However, the reflection suppression member is not limited to this example. For example, multilayer dielectric films may be used as the reflection suppression member.

In the eighth example, two substrates are stacked to form the polarized light separation variable angle element 120. Alternatively, three or more substrates are stacked to form the polarized light separation variable angle element 120.

In the ninth example, the opening 321*a* of the substrate 321 is circular. However, shape of the opening 321*a* is not limited to this example. Arbitrary shape may be employed as the shape of the opening 131*a*. In the tenth example, the opening 331*a* of the substrate 331 is rectangular. However, shape of the opening 331*a* is not limited to this example. Arbitrary shape may be employed as the shape of the opening 331*a*.

<Aspects>

The present disclosure has various aspects, examples of which will be described below.

According to a first aspect of the present disclosure, a radar apparatus is provided. The radar apparatus receives a reflected wave of a transmitted electromagnetic wave to detect a distance to an object that reflects the electromagnetic wave. The radar apparatus comprises a scan part and an electromagnetic wave emitter. The scan part includes a polarized light separation member configured to pass a preset first component of the electromagnetic wave and reflect a preset second component of the electromagnetic wave. The first and second components, respectively, are polarized lights having first and second polarization directions, which are perpendicular to each other. The scan part scans the second component of the electromagnetic wave in a predetermine scan angle range by rotating the polarized light separation member around a predetermined rotation axis. The electromagnetic wave emitter emits the electromagnetic wave toward the polarized light separation member of the scan part.

In the above radar apparatus, when the electromagnetic wave emitted from the electromagnetic wave emitter arrives at the polarized light separation member, the first component of the incident electromagnetic wave transmits through the polarized light separation member while the second component of the incident electromagnetic wave is reflected by the polarized light separation member. The reflected second component is sent in a direction corresponding to a scan angle of the polarized light separation member.

In the above radar apparatus, both of the polarized light separating of the electromagnetic wave and the scanning of the electromagnetic wave are performed by the polarized light separation member. Thus, it is possible to eliminate the need for adjustment of a positional relationship between a scan element and a polarized light separation element. Additionally, because of reduction of the number of elements, the radar apparatus can be downsized.

The above radar apparatus may be configured as follows. The radar apparatus further comprises an electromagnetic wave detector and a conversion reflector. The electromagnetic wave detector is disposed on an opposite side of the polarized light separation member from the electromagnetic wave emitter so that the electromagnetic wave detector detects the electromagnetic wave that has emitted from the electromagnetic wave emitter toward the polarized light separation member and thereafter has transmitted through the polarized light separation member. The conversion reflector is disposed on an opposite side of the polarized light separation member from a scan passage region. The conversion reflector reflects the electromagnetic wave that has traveled from the scan passage region to the polarized light separation member and thereafter has transmitted through the polarized light separation member. The scan passage region is a region through which the electromagnetic wave scanned by the scan part passes. The conversion reflector reflects the incident electromagnetic wave in a direction opposite to an incident direction while converting a direction of polarization of the electromagnetic wave into the second polarization direction.

In the above radar apparatus, when the electromagnetic wave emitted from the electromagnetic wave emitter arrives at the polarized light separation member, the first component of the electromagnetic wave transmits through the polarized light separation member and thereafter is detected by the electromagnetic wave detector. The electromagnetic wave detector is disposed on the opposite side of the polarized light separation member from the electromagnetic wave emitter.

The second component of the electromagnetic wave, which has the second polarization direction, is reflected by the polarized light separation member and is sent in a direction corresponding to the scan angle of the polarized light separation member. Thereafter, the electromagnetic wave reflected by the object (also called "reflected electromagnetic wave") passes through the scan passage region, and arrives at the polarized light separation member. In this case, the first component of the reflected electromagnetic wave transmits through the polarized light separation member. Thereafter, the reflected electromagnetic wave that has transmitted through the polarized light separation member arrives at the conversion reflector, which is disposed on the opposite side of the polarized light separation member from the scan passage region. The conversion reflector reflects the incident reflected electromagnetic wave in a direction opposite to the incident direction while converting the direction of polarization of the reflected electromagnetic wave into the second polarization direction.

As a result, the reflected electromagnetic wave reflected by the conversion reflection element arrives at the polarized light separation member. Since the direction of polarization of this reflected electromagnetic wave has been converted into the second polarization direction, the reflected electromagnetic wave is reflected by the polarized light separation member and thereafter detected by the electromagnetic wave detector.

Therefore, in the above radar apparatus, the electromagnetic wave detector detects both of the electromagnetic wave un-reflected by the object and the electromagnetic wave reflected by the object. By using these two electromagnetic waves, it is possible to measure the distance to the object reflecting the electromagnetic wave by using time of flight (TOF) or light heterodyne.

Alternatively, the radar apparatus may be configured as follows. The radar apparatus further comprises an electromagnetic wave detector disposed on an opposite side of the polarized light separation member from a scan passage region. The electromagnetic wave detector detects the electromagnetic wave that has traveled from the scan passage region to the polarized light separation member and thereafter has transmitted through the polarized light separation member. The scan passage region is a region through which the electromagnetic wave scanned by the scan part passes.

In the above radar apparatus, when the electromagnetic wave emitted from the electromagnetic wave emitter arrives at the polarized light separation member, the second component of the electromagnetic wave is reflected by the polarized light separation member and is sent in the direction corresponding to the scan angle of the polarized light separation member. When the electromagnetic wave reflected by the object travels from the scan passage region to the polarized light separation member, the first component of the electromagnetic wave transmits through the polarized light separation member. Therefore, the first component of the electromagnetic wave is detected by the electromagnetic wave detector, which is disposed on the opposite side of the polarized light separation member from the scan passage region.

In the above radar apparatus, based on the electromagnetic wave reflected by the object and then detected by the electromagnetic wave detector, it is possible to detect the distance to the object that reflects the electromagnetic wave. In cases where the electromagnetic wave emitter emits a pulsed wave, the radar apparatus may further comprise a detector for detecting a time when the pulsed wave is emitted. In this configuration, by time-of-flight, it is possible to measure the distance to the object that reflects the electromagnetic wave.

The above radar apparatus may be configured as follows. The polarized light separation member includes; at least one plate-shaped substrate transparent to the electromagnetic wave; and a micro periodic structure arranged as a grating including a plurality of thin wires which are disposed on the substrate, are parallel to the first polarization direction, and are arranged at predetermined intervals smaller than wavelength of the electromagnetic wave.

According to the above configuration, since the micro periodic structure can be formed using an ultra-fine processing technology, the polarized light separation member can be downsized as compared with a conventional one such as a prism polarized light splitter, in which rectangular prisms are bonded and arranged into a cubic form.

The above radar apparatus may be configured to further comprise an electromagnetic wave reflection suppression member disposed on at least one of two opposite surfaces of the substrate.

According to the above configuration, the reflection of the electromagnetic wave by the polarized light separation member is reduced, and as a result, the electromagnetic wave to be detected by the electromagnetic wave detector is ensured. Therefore, the radar apparatus can have high detection accuracy.

The above radar apparatus may be configured as follows. The at least one substrate of the polarized light separation member is two or more substrates stacked. In this configuration, each of the two or more substrates can have a polarized light separation function. Thus, the polarized light separation member can have a better polarized light separation performance as compared with use of a single substrate.

The above radar apparatus may be configured as follows. The substrate is made of such a material that the electromagnetic wave different in frequency from the electromagnetic wave emitted from the electromagnetic wave emitter is blocked from passing through the substrate According to this configuration, the electromagnetic wave different in frequency from the electromagnetic wave emitted from the electromagnetic wave emitter is blocked from transmitting through the polarized light separation member and from being detected as noise. The radar apparatus can have high detection accuracy.

Alternatively, the above radar apparatus may be configured as follows. The substrate has an opening. The micro periodic structure is formed on an open end of the opening of the substrate.

According to the above radar apparatus, when transmitting through the micro periodic structure, the first component of the electromagnetic wave passes through an inside of the opening. Thus, a material of the substrate needs not be transparent to the electromagnetic wave emitted from the electromagnetic wave emitter. Therefore, it is possible to expand the possibility of substrate material selection.

The above radar apparatus may be configured to further comprise a support member elongated in an elongated direction perpendicular to the first polarization direction. The support member is disposed over the open end of the opening of the substrate, and supports the plurality of thin wires of the micro periodic structure.

According to the above radar apparatus, because of the support member, the thin wires of the micro periodic structure are supported at not only a periphery of the opening but also the inside of the opening. Therefore, disconnection of thin wires due to weight of the thin wires can be prevented as compared with a case where the thin wires are supported at only the periphery of the opening.

The above radar apparatus may be configured to further comprise a polarization converter disposed in a scan passage region, which is a region through which the electromagnetic wave scanned by the scan part passes. The polarization converter converts a linearly-polarized light into a circularly-polarized light and converts the circularly-polarized light into the linearly-polarized light. The polarization converter may be a quarter-wave plate.

According to this configuration, when the electromagnetic wave emitted from the electromagnetic wave emitter arrives at the polarized light separation member, the second component of the electromagnetic wave is reflected by the polarized light separation member and is sent in the direction corresponding to the scan angle of the polarized light separation member. The sent electromagnetic wave is converted from the linearly-polarized light to the circularly-polarized light by the polarization convertor. Thereafter, the circularly-polarized light may arrive at the object. In reflecting the electromagnetic wave, the object may not rotate the polarization direction of the electromagnetic light because of its surface material (e.g., cat's-eye). In this case, the electromagnetic wave reflected by the object (i.e., reflected electromagnetic wave) is converted from the circularly-polarized light to the linearly-polarized light by the polarization convertor, and as a result, the converted electromagnetic wave is the first component having the first polarization direction. This first component arrives at the polarized light separation member, and transmits through the polarized light separation member.

In this way, the above radar apparatus can measure a distance to an object even if a surface material of the object does not rotate the polarization direction in reflecting the electromagnetic wave.

The radar apparatus may be configured to further comprise a ratio converter disposed on an optical path of the electromagnetic wave from the electromagnetic wave emitter to the polarized light separation member. The ratio converter changes a ratio between the first component and the second component of the incident electromagnetic wave. The ratio converter may be a half-wave plate.

According to this configuration, regarding the electromagnetic wave emitted from the electromagnetic wave emitter to the polarized light separation member, a ratio between the electromagnetic wave transmitting through the polarized light separation member and the electromagnetic wave reflected by the polarized light separation member can be changed.

According to a second aspect of the present disclosure, a light scan apparatus is provided. The light scan apparatus comprises a visible light emitter, an invisible light emitter, a light combiner, a light separator, an invisible light detector, and a polarized light scan part. The visible light emitter emits a visible light. The invisible light emitter emits an invisible light. The light combiner combines the visible light emitted from the visible light emitter and the invisible light emitted from the invisible light emitter, and emits the combined visible and invisible lights in a preset direction. The polarized light scan part scans a preset first polarized light in a predetermined scan angle range by reflecting the first polarized light toward the light separator when the visible and invisible lights coming from the light combiner are incident on the polarized light scan part. The light separator passes a first part of an incident light and reflects a second part of the incident light at a reflection angle corresponding to an incident angle of the incident light. The first part of the incident light is a light that has a same wavelength as the invisible light emitted from the invisible light emitter. The second part of the incident light is a light that has a same wavelength as the visible light emitted from the visible light emitter;

Because of the above, the visible light reflected by the light separator can be scanned at an angle corresponding to the scan angle of the polarized light scan part. Thus, depending on the scan angle of the polarized light scan part, it is possible to control whether or not to irradiate with the visible laser light. Additionally, it is possible to control the color of the visible laser light. In this way, an image can be displayed.

Moreover, since the invisible light transmitting through the light separator can be scanned at the angle corresponding to the scan angle of the polarized light scan part, the invisible light can be used as the radar wave for detecting an object that is located on an opposite side of the light separator from the polarized light scan part.

The polarized light scan part guides a preset second polarized light toward the invisible light detector when a light coming from a scan passage region is incident on the polarized light scan part. The invisible light detector detects an incident light when the incident light has the same wavelength as the invisible light emitted from the invisible light emitter. In the above, the scan passage region is a region through which the first polarized light scanned by the polarized light scan part travels. Additionally, the first polarized light and the second polarized light, respectively, have a first polarization direction and a second polarization direction perpendicular to each other.

In this way, when an object on an opposite side of the light separator from the polarized light scan part reflects the invisible light, the invisible light detector detects the invisible light. Additionally, based on a time difference between emission of the invisible laser light by the invisible light emitter and detection of the invisible light by the invisible light detector, it is possible to measure a distance to the object reflecting the invisible eight.

Therefore, the polarized light scan part can scan both of the visible light for displaying an image and the invisible laser light for detecting an object. That is, the same part acts as a scanning means for image display and a scanning means for object detection. Therefore, the number of elements of the light scan apparatus and the size of the light scan apparatus can be reduced as compared with a case where a scanning means for image display and a scanning means for object detection are separated.

Furthermore, in the above light scan apparatus, since the light combiner combines the visible light and the invisible light, an optical axis adjustment between the light combiner and the polarized light scan part is needed. However, it is unnecessary to perform both of an optical axis adjustment for the visible light and an optical axis adjustment for the invisible light. Thus, an amount of work for the optical axis adjustment can be reduced as compared with cases where a means fro scanning the visible laser light and a means fro scanning the invisible laser light are separated.

The above light scan apparatus may be configured as follows. The polarized light scan part includes a polarized light separation member configured to pass the second polarized light and reflect the first polarized light. The polarized light scan part rotates the polarized light separation member around a predetermined rotation axis, thereby scanning the first polarized light in the predetermined scan angle range According to this configuration, when the visible and invisible lights emitted from the light combiner are incident on the polarized light separation member, the second polarized light of the incident lights transmits through the polarized light separation member while the first polarized light of the incident lights is reflected by the polarized light separation member, so that the reflected first polarized light is sent in a direction corresponding to a scan angle of the polarized light separation member.

Therefore, In the above light scan apparatus, both of the polarize light separating and the light scanning are performed by the polarized light separation member. Thus, the need for adjustment of a positional relationship between a scan element and a polarized light separation element can be eliminated. Additionally, because of reduction of the number of elements, the light scan apparatus can be downsized.

The above light scan apparatus may be configured as follows. The polarized light scan part further includes a conversion reflector. The conversion reflector is disposed on an opposite side of the polarized light separation member from the scan passage region, so that the light entering from the scan passage region into the polarized light separation member and transmitting through the polarized light separation member is incident on the conversion reflector and is reflected by the conversion reflector while being converted into the first polarized light. The invisible light detector is disposed on an opposite side of the polarized light separation member from the light combiner.

According to this configuration, the light (i.e., the second polarized light) enters from the scan passage region into the polarized light separation member and transmits through the polarized light separation member. The conversion reflector reflects this second polarized light toward the polarized light separation member while converting into the first polarized light. As a result, the light reflected by the conversion reflector is incident on the polarized light separation member. Since this light was converted into the first polarized light, this light is reflected by the polarized lights separation member and detected by the invisible light detector, which is disposed on the opposite side of the polarized light separation member from the light combiner.

Therefore, the invisible light detector for detecting the light reflected by the object is not limited to being located on an opposite side of the polarized light separation member from the object. It is possible to achieve high flexibility in location of the invisible laser detector Alternatively, the above light scan apparatus may be configured as follows. The invisible light detector is disposed on an opposite side of the polarized light separation member from the scan passage region. According to this configuration, the light (i.e., second polarized light) enters from the scan passage region into the polarized light separation member, transmits through the polarized light separation member, and enters into the invisible light detector. In this way, the light reflected by the object can be detected. Thus, the conversion reflector can be omitted. The light scan apparatus can be downsized.

The above light scan apparatus may be configured as follows. The polarized light separation member includes at least one plate-shaped substrate and a micro periodic structure. The substrate is transparent to the visible light and the invisible light. The micro periodic structure is arranged as a grating including a plurality of thin wires which are made of an electrically conductive material, are parallel to the second polarization direction, and are arranged at predetermined intervals smaller than wavelength of each of the visible light and the invisible light.

According to the above configuration, since the micro periodic structure can be formed using an ultra-fine processing technology, the polarized light separation member can be downsized as compared with a conventional one such as a prism polarized light splitter, in which rectangular prisms are bonded and arranged into a cubic form.

The above light scan apparatus may further comprise an invisible light reflection suppression member disposed on at least one of two opposite surfaces of the substrate. The invisible light reflection suppression member may be a member having dielectric multilayer films, a moth eye structure, or the like.

According to the above configuration, the invisible light to be detected by the invisible light detector is not reduced by the reflection of the invisible light by the polarized light separation member. Therefore, the invisible light detector can have high detection accuracy.

The above light scan apparatus may be configured as follows. The at least one substrate of the polarized light separation member is two or more substrates stacked. In this configuration, each of the two or more substrates can have a polarized light separation function. Thus, the polarized light separation member can have a better polarized light separation performance as compared with use of a single substrate.

The above light scan apparatus may be configured as follows. The substrate is made of such a material that an electromagnetic wave different in frequency from the visible light and the invisible light is blocked from passing through the substrate.

According to this configuration, the electromagnetic wave different in frequency from the visible light and the invisible light is blocked from passing through the substrate and from being detected as noise by the invisible light detector. The invisible light detector can have high detection accuracy.

The above light scan apparatus may be configured as follows. The substrate has an opening. The micro periodic structure is formed on an open end of the opening of the substrate.

According to this configuration, in transmitting through the micro periodic structure, the second polarized light passes through an inside of the opening. Thus, a material of the substrate needs not be transparent to the visible light and the invisible light. Therefore, substrate material selection flexibility increases.

The above light scan apparatus may further comprises a support member elongated in an elongated direction perpendicular to the second polarization direction. The support member may be disposed over the open end of the opening of the substrate, and may support the plurality of thin wires of the micro periodic structure.

According to this configuration, because of the support member, the thin wires of the micro periodic structure are supported at not only a periphery of the opening but also the inside of the opening. Therefore, disconnection of thin wires due to weight of the thin wires can be prevented as compared with a case where the thin wires are supported at only the periphery of the opening.

The above light scan apparatus may further comprise a head-up display device configured to reflect the visible light, which has been reflected by the light separator, toward the a windshield of a vehicle, thereby providing a virtual image to an occupant of the vehicle.

According to this configuration, when a radar for detecting an object in front of a vehicle and a head-up display device for displaying a virtual image to an occupant of the vehicle are mounted to the vehicle, the light scan apparatus has an optical system shared by the radar and the head-up display device.

The above light scan may be configured as follows. The light separator reflects the first part of the incident light at a reflection angle corresponding to an incident angle of the incident light. The first part of the incident light is the light having the same wavelength as the invisible light emitted from the invisible light emitter. The head-up display device reflects the invisible light, which has been reflected by the light separator, toward a windshield of the vehicle.

According to this configuration, since the windshield of the vehicle is irradiated with the invisible light, the driver's face can be irradiated with the invisible light reflected by the windshield. The driver's face irradiated with the invisible light can be imaged with an invisible light imaging device (e.g., camera), so that the gaze of the driver can be detected. Therefore, the invisible light for detecting an object in front of the vehicle can be also used to detect the gaze of the driver.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A radar apparatus for detecting a distance to an object by receiving an electromagnetic wave reflected by the object, the radar apparatus comprising:
    a scan part including
        a polarized light separation member configured to pass a preset first component of the electromagnetic wave and reflect a preset second component of the electromagnetic wave,
        wherein the first and second components, respectively, are polarized lights having first and second polarization directions, which are perpendicular to each other, wherein the scan part scans the second component of the electromagnetic wave in a predetermine scan angle range by rotating the polarized light separation member around a predetermined rotation axis;

an electromagnetic wave emitter configured to emit the electromagnetic wave toward the polarized light separation member of the scan part, an electromagnetic wave detector disposed on an opposite side of the polarized light separation member from the electromagnetic wave emitter so that the electromagnetic wave detector detects the electromagnetic wave that has emitted from the electromagnetic wave emitter toward the polarized light separation member and thereafter has transmitted through the polarized light separation member; and a conversion reflector disposed on an opposite side of the polarized light separation member from a scan passage region, wherein:

the conversion reflector reflects the electromagnetic wave that has traveled from the scan passage region to the polarized light separation member and thereafter has transmitted through the polarized light separation member;

the scan passage region is a region through which the electromagnetic wave scanned by the scan part passes; and the conversion reflector reflects the incident electromagnetic wave in a direction opposite to an incident direction while converting a direction of polarization of the electromagnetic wave into the second polarization direction.

2. A radar apparatus for detecting a distance to an object by receiving an electromagnetic wave reflected by the object, the radar apparatus comprising:

a scan part including a polarized light separation member configured to pass a preset first component of the electromagnetic wave and reflect a preset second component of the electromagnetic wave, wherein the first and second components, respectively, are polarized lights having first and second polarization directions, which are perpendicular to each other, wherein the scan part scans the second component of the electromagnetic wave in a predetermine scan angle range by rotating the polarized light separation member around a predetermined rotation axis; and an electromagnetic wave emitter configured to emit the electromagnetic wave toward the polarized light separation member of the scan part, wherein:

the polarized light separation member includes:

at least one plate-shaped substrate transparent to the electromagnetic wave; and a micro periodic structure arranged as a grating including a plurality of thin wires which are disposed on the substrate, are parallel to the first polarization direction, and are arranged at predetermined intervals, the predetermined interval being smaller than wavelength of the electromagnetic wave.

3. The radar apparatus according to claim 2, further comprising:

an electromagnetic wave reflection suppression member disposed on at least one of two opposite surfaces of the substrate.

4. The radar apparatus according to claim 2, wherein:
the at least one substrate of the polarized light separation member is two or more substrates stacked.

5. The radar apparatus according to claim 2, wherein:
the substrate is made of such a material that
the electromagnetic wave different in frequency from the electromagnetic wave emitted from the electromagnetic wave emitter is blocked from passing through the substrate.

6. The radar apparatus according to claim 2, wherein:
the substrate has an opening; and
the micro periodic structure is formed on an open end of the opening of the substrate.

7. The radar apparatus according to claim 6, further comprising:

a support member elongated in an elongated direction perpendicular to the first polarization direction, wherein:

the support member is disposed over the open end of the opening of the substrate, and supports the plurality of thin wires of the micro periodic structure.

8. The radar apparatus according to claim 1, further comprising:

a polarization converter disposed in a scan passage region, which is a region through which the electromagnetic wave scanned by the scan part travels, wherein:

the polarization converter converts a linearly-polarized light into a circularly-polarized light and converts the circularly-polarized light into the linearly-polarized light.

9. A radar apparatus for detecting a distance to an object by receiving an electromagnetic wave reflected by the object, the radar apparatus comprising:

a scan part including a polarized light separation member configured to pass a preset first component of the electromagnetic wave and reflect a preset second component of the electromagnetic wave, wherein the first and second components, respectively, are polarized lights having first and second polarization directions, which are perpendicular to each other, wherein the scan part scans the second component of the electromagnetic wave in a predetermine scan angle range by rotating the polarized light separation member around a predetermined rotation axis;

an electromagnetic wave emitter configured to emit the electromagnetic wave toward the polarized light separation member of the scan part, and a ratio converter disposed on an optical path of the electromagnetic wave from the electromagnetic wave emitter to the polarized light separation member, wherein:

the ratio converter changes a ratio between the first component and the second component of the incident electromagnetic wave.

10. A light scan apparatus comprising:
a visible light emitter configured to emit a visible light;
an invisible light emitter configured to emit an invisible light;
a light combiner configured to
combine the visible light emitted from the visible light emitter and the invisible light emitted from the invisible light emitter, and
emit the combined visible and invisible lights in a preset direction;

a light separator configured to
  pass a first part of an incident light and
  reflect a second part of the incident light at an reflection angle corresponding to an incident angle of the incident light,
  wherein the first part of the incident light is a light that has a same wavelength as the invisible light emitted from the invisible light emitter,
  wherein the second part of the incident light is a light that has a same wavelength as the visible light emitted from the visible light emitter;
an invisible light detector configured to detect an incident light when the incident light has the same wavelength as the invisible light emitted from the invisible light emitter; and
a polarized light scan part configured to
  scan a preset first polarized light in a predetermined scan angle range by reflecting the first polarized light toward the light separator when the visible and invisible lights coming from the light combiner are incident on the polarized light scan part, and
  guide a preset second polarized light toward the invisible light detector when a light coming from a scan passage region is incident on the polarized light scan part,
  wherein the first polarized light and the second polarized light, respectively, have a first polarization direction and a second polarization direction perpendicular to each other,
  wherein the scan passage region is a region through which the first polarized light scanned by the polarized light scan part travels.

11. The light scan apparatus according to claim 10, wherein:
  the polarized light scan part includes
    a polarized light separation member configured to pass the second polarized light and reflect the first polarized light; and
  the polarized light scan part rotates the polarized light separation member around a predetermined rotation axis, thereby scanning the first polarized light in the predetermined scan angle range.

12. The light scan apparatus according to claim 11, wherein:
  the polarized light scan part further includes a conversion reflector;
  the conversion reflector is disposed on an opposite side of the polarized light separation member from the scan passage region, so that the light entering from the scan passage region into the polarized light separation member and transmitting through the polarized light separation member is incident on the conversion reflector and is reflected by the conversion reflector while being converted into the first polarized light; and
  the invisible light detector is disposed on an opposite side of the polarized light separation member from the light combiner.

13. The light scan apparatus according to claim 11, wherein:
  the invisible light detector is disposed on an opposite side of the polarized light separation member from the scan passage region.

14. The light scan apparatus according to claim 11, wherein:
  the polarized light separation member includes
    at least one plate-shaped substrate transparent to the visible light and the invisible light and
    a micro periodic structure arranged as a grating including a plurality of thin wires which are made of an electrically conductive material, are parallel to the second polarization direction, and are arranged at predetermined intervals, the predetermined interval being smaller than wavelength of each of the visible light and the invisible light.

15. The light scan apparatus according to claim 14, further comprising:
  an invisible light reflection suppression member disposed on at least one of two opposite surfaces of the substrate.

16. The light scan apparatus according to claim 14, wherein:
  the at least one substrate of the polarized light separation member is two or more substrates stacked.

17. The light scan apparatus according to claim 14, wherein:
  the substrate is made of such a material that
    an electromagnetic wave different in frequency from the visible light and the invisible light is blocked from passing through the substrate.

18. The light scan apparatus according to claim 14, wherein:
  the substrate has an opening; and
  the micro periodic structure is formed on an open end of the opening of the substrate.

19. The light scan apparatus according to claim 18, further comprising:
  a support member elongated in an elongated direction perpendicular to the second polarization direction,
  wherein the support member is disposed over the open end of the opening of the substrate, and supports the plurality of thin wires of the micro periodic structure.

20. The light scan apparatus according to claim 10, further comprising:
  a head-up display device configured to reflect the visible light, which has been reflected by the light separator, toward the a windshield of a vehicle, thereby providing a virtual image to an occupant of the vehicle.

21. The light scan apparatus according to claim 20, wherein:
  the light separator reflects the first part of the incident light at a reflection angle corresponding to an incident angle of the incident light;
  the first part of the incident light is the light having the same wavelength as the invisible light emitted from the invisible light emitter; and
  the head-up display device reflects the invisible light, which has been reflected by the light separator, toward the windshield of the vehicle.

* * * * *